US008174491B2

(12) United States Patent
Machida et al.

(10) Patent No.: US 8,174,491 B2
(45) Date of Patent: May 8, 2012

(54) IMAGE DISPLAY MEDIUM AND IMAGE DISPLAY DEVICE

(75) Inventors: Yoshinori Machida, Kanagawa (JP); Yasufumi Suwabe, Kanagawa (JP); Satoshi Tatsuura, Kanagawa (JP); Masaaki Abe, Kanagawa (JP); Kiyoshi Shigehiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 776 days.

(21) Appl. No.: 12/034,859

(22) Filed: Feb. 21, 2008

(65) Prior Publication Data

US 2008/0303779 A1 Dec. 11, 2008

(30) Foreign Application Priority Data

Jun. 5, 2007 (JP) ................................ 2007-149239

(51) Int. Cl.
*G09G 3/34* (2006.01)
*G02B 26/00* (2006.01)

(52) U.S. Cl. ........................................ 345/107; 359/296

(58) Field of Classification Search ................... 345/107
See application file for complete search history.

(56) References Cited

U.S. PATENT DOCUMENTS

| | | | | |
|---|---|---|---|---|
| 4,806,443 | A | 2/1989 | Yanus et al. | |
| 6,128,124 | A * | 10/2000 | Silverman | 359/296 |
| 7,408,696 | B2 * | 8/2008 | Liang et al. | 359/296 |
| 7,564,615 | B2 * | 7/2009 | Ahn et al. | 359/296 |
| 2006/0077171 | A1 * | 4/2006 | May et al. | 345/107 |

FOREIGN PATENT DOCUMENTS

| | | |
|---|---|---|
| JP | A 07-325434 | 12/1995 |
| JP | A 10-003177 | 1/1998 |
| JP | A 2003-131420 | 5/2003 |
| JP | A 2003-149690 | 5/2003 |
| JP | A 2005-326570 | 11/2005 |

* cited by examiner

*Primary Examiner* — Duc Dinh

(74) *Attorney, Agent, or Firm* — Oliff & Berridge, PLC

(57) ABSTRACT

An image display medium including a pair of substrates, a transparent dispersion medium, one or more kind of colored particles and larger sized colored particles. The pair of substrates is disposed with a separation therebetween and at least one of the pair of substrates is transparent. The dispersion medium is transparent and enclosed between the pair of substrates. Each kind of the colored particles is colored a predetermined color, is dispersed in the dispersion medium, has predetermined charge characteristics or predetermined magnetic properties, and is able to migrate between the pair of substrates. The larger sized colored particles have a different color and a larger particle size than the colored particles, are disposed so that the colored particles are able to pass through the separation, have charge characteristics or magnetic properties which are different from those of the colored particles, and are able to move.

19 Claims, 13 Drawing Sheets

IMAGE DISPLAY MEDIUM AND IMAGE DISPLAY DEVICE

CROSS-REFERENCE TO RELATED APPLICATIONS

This application is based on and claims priority under 35 USC 119 from Japanese Patent Application No. 2007-149239 filed Jun. 5, 2007.

BACKGROUND

1. Technical Field

The present invention relates to an image display medium and an image display device.

2. Related Art

There are conventionally known image display media that use colored particles as an image display medium, and with which repeated rewriting is possible.

Such image display media are configured, for example, to include a transparent dispersion medium 64 enclosed between a pair of substrates (a display substrate 60 and a back substrate 62), colored migration particles 66, and white particles 68, as shown in FIG. 13A and 13B. The migration particles 66 are distributed in the dispersion medium 64 and migrate between the substrates according to an electric field formed between the substrates. The white particles 68 are disposed densely between the substrates, and are of a size that is greater than that of the migration particles 66. The migration particles 66 migrate through the gaps between the white particles 68. Moreover, there are spacing members 70 provided between the substrates, in order to divide the space between the substrates into plural cells, so that particles are prevented from becoming unevenly disposed in specific regions of the substrates, or the like.

In such image display media, by applying a voltage between the pair of substrates, the enclosed migration particles are caused to migrate, and colored images are displayed according to the quantity of the migration particles which migrate and the color of the migration particles which migrate. When, for example, the migration particles are migrated to the display substrate side, as shown in FIG. 13A, the color of the migration particles may be observed from the display substrate side. When the migration particles are migrated to the back substrate side, as shown in FIG. 13B, since the migration particles are concealed by the white particles, the white of the white particles is displayed. Moreover, control of the magnitude of the movement of the target migration particles is performed by controlling the voltage applied between the substrates (the electric field strength formed between the substrates is controlled) according to the density of the target image. In this manner, images are displayed according to the density of the display images.

SUMMARY

In consideration of the above circumstances, the present invention provides an image display medium and an image display device.

According to an aspect of the invention, there is provided an image display medium comprising: a pair of substrates, disposed with a separation therebetween, at least one of the pair of substrates being transparent; a transparent dispersion medium that is enclosed between the pair of substrates; one or more kind of colored particles, each kind of the colored particles being colored a predetermined color and being dispersed in the dispersion medium, each kind of the colored particles having predetermined charge characteristics or predetermined magnetic properties and being able to migrate between the pair of substrates; and larger sized colored particles that have a different color and a larger particle size than those of the colored particles, the larger sized colored particles being disposed so that the colored particles are able to pass through the separation, the larger sized colored particles having charge characteristics or magnetic properties which are different from the colored particles, and the larger sized colored particles being able to move.

BRIEF DESCRIPTION OF THE DRAWINGS

Exemplary embodiments of the present invention will be described in detail based on the following figures, wherein.

Figure 8:
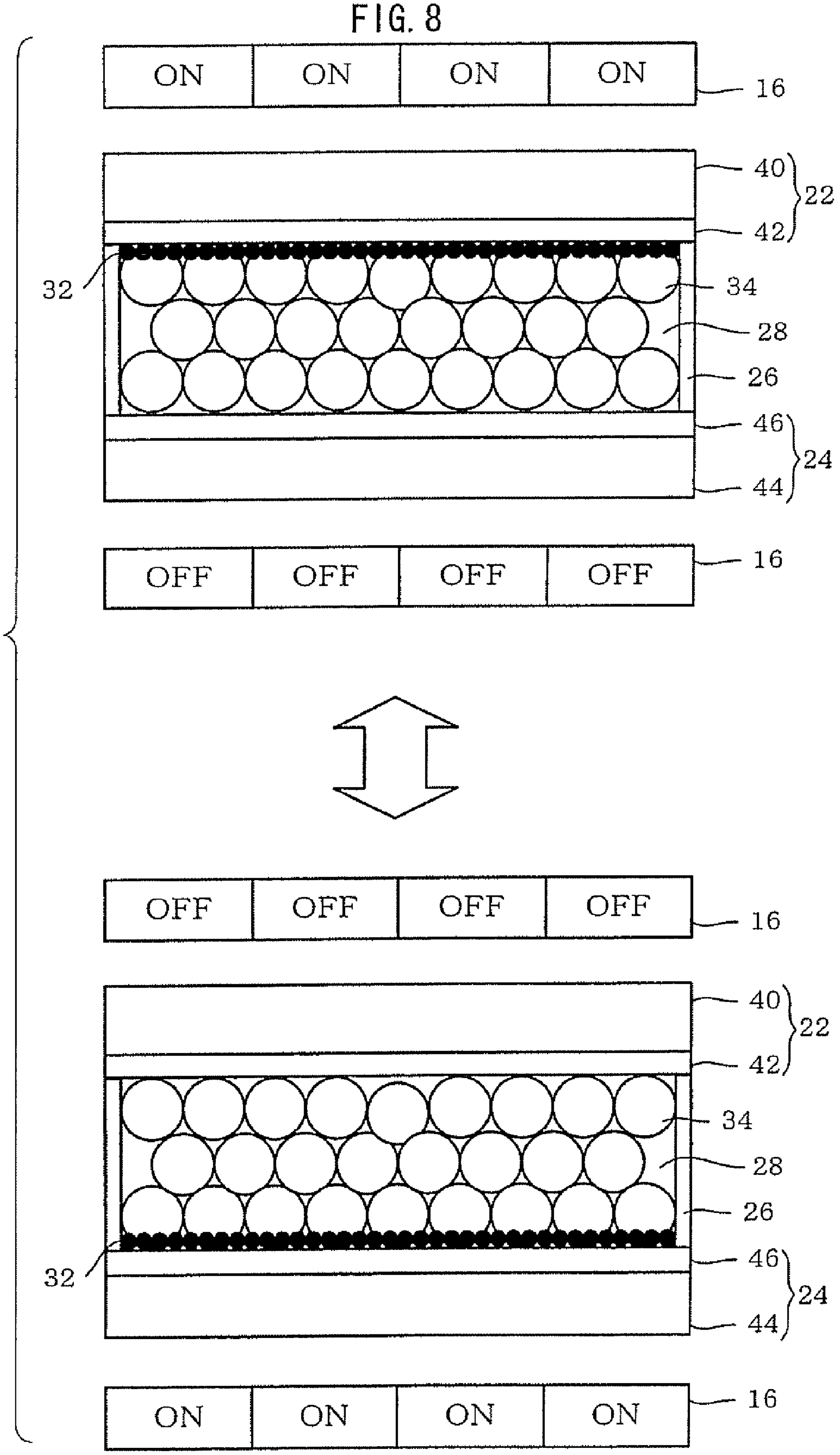
Figure 9:
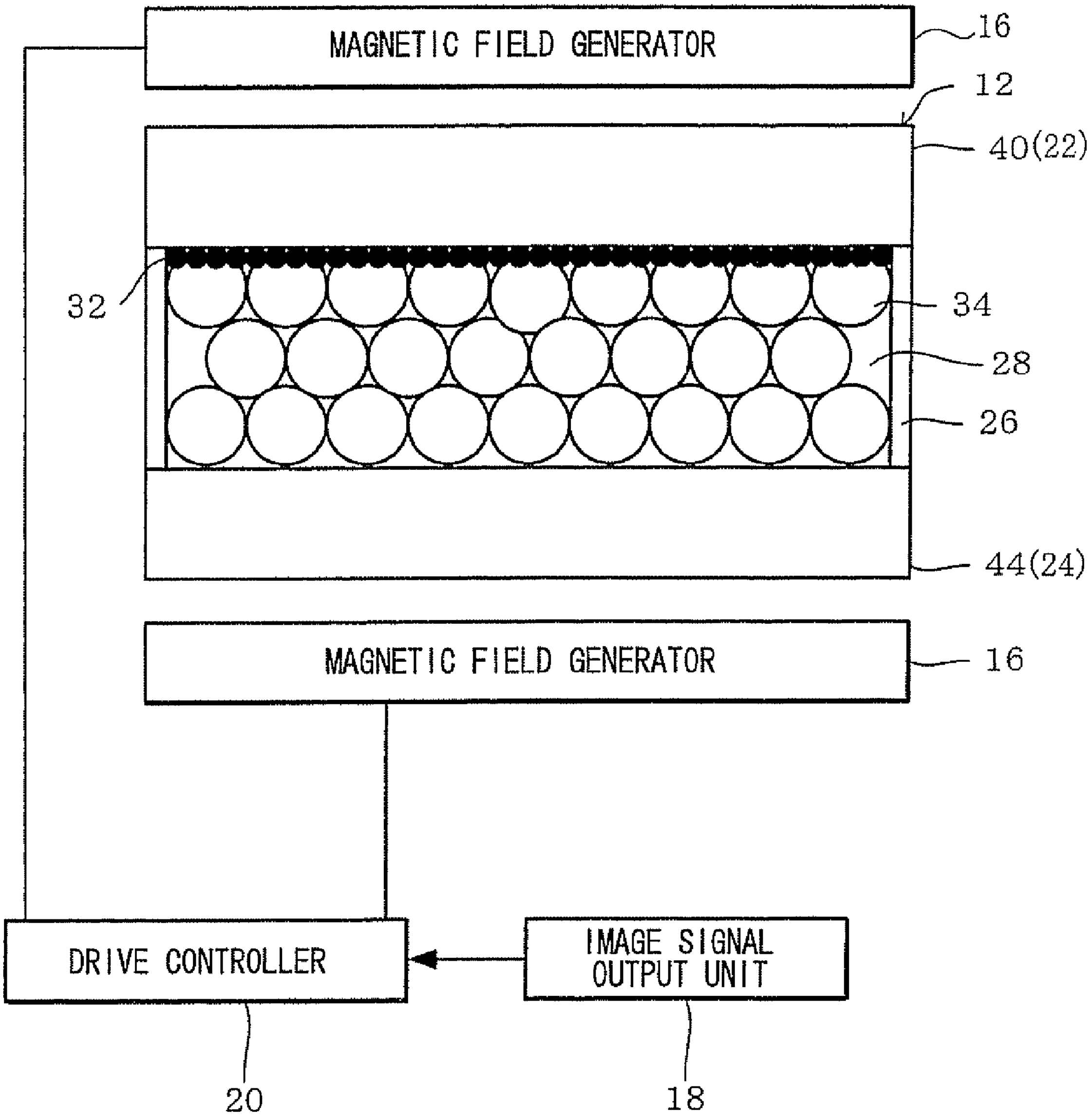
Figure 10:
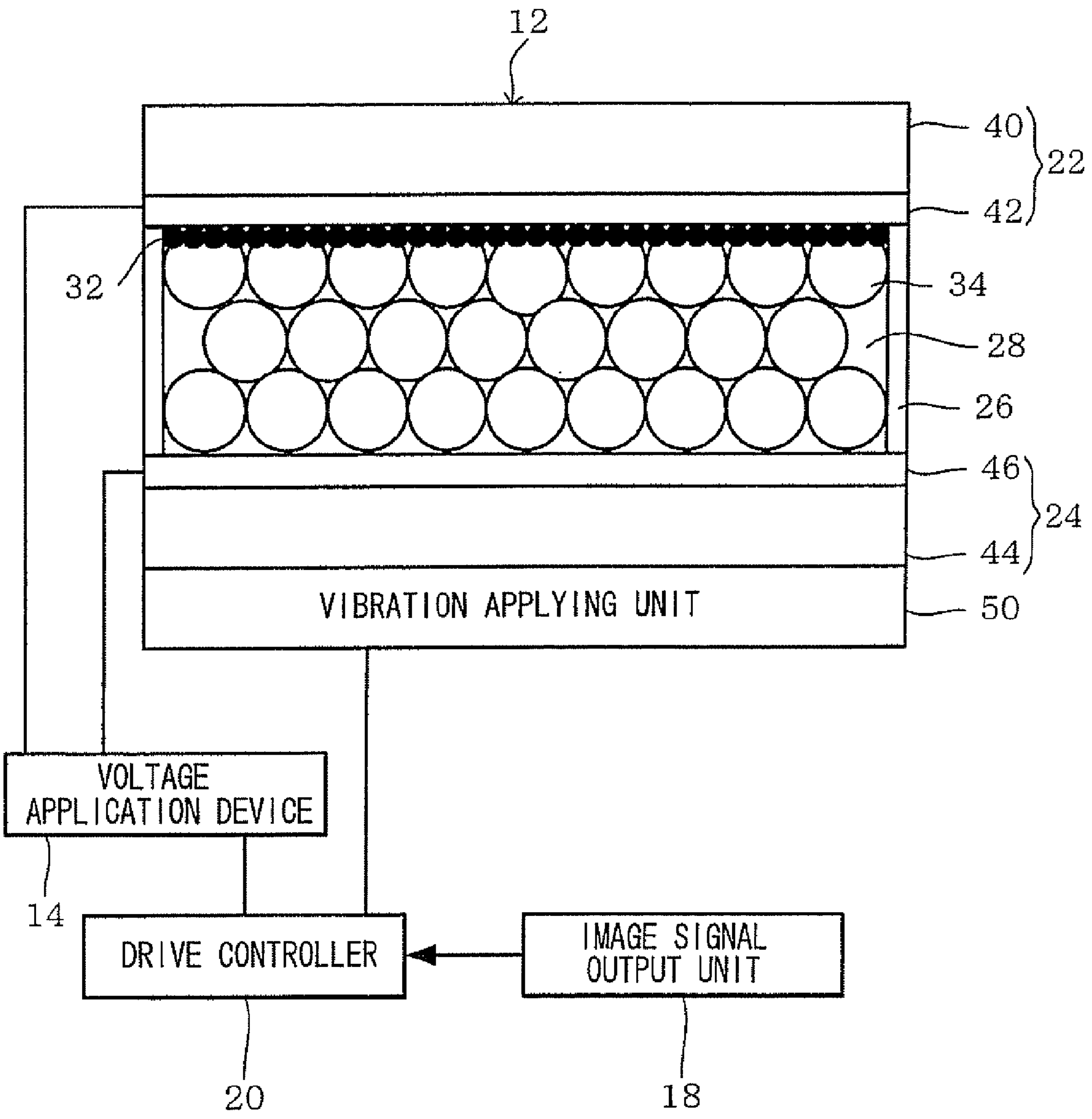
Figure 11:
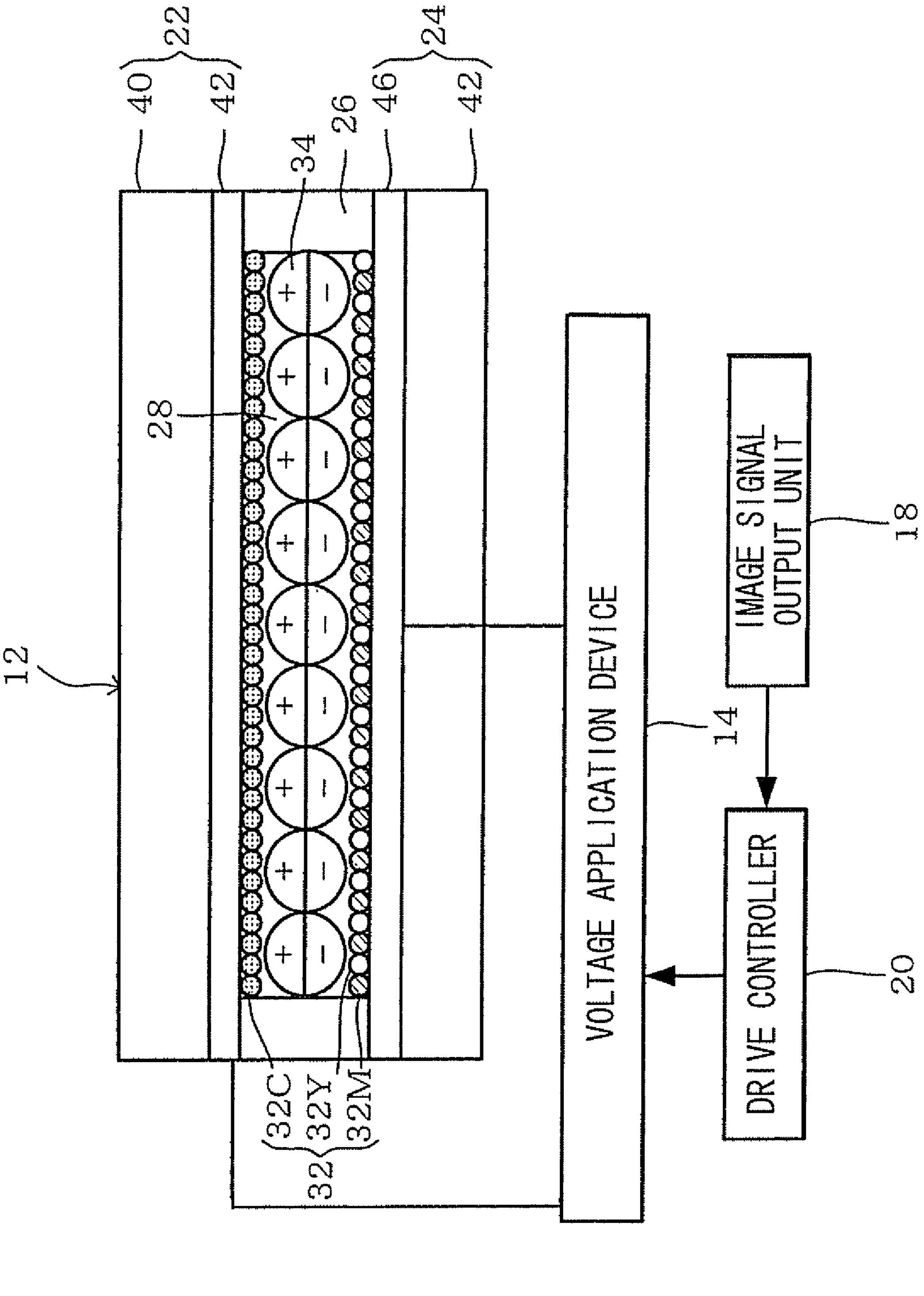
Figure 12:
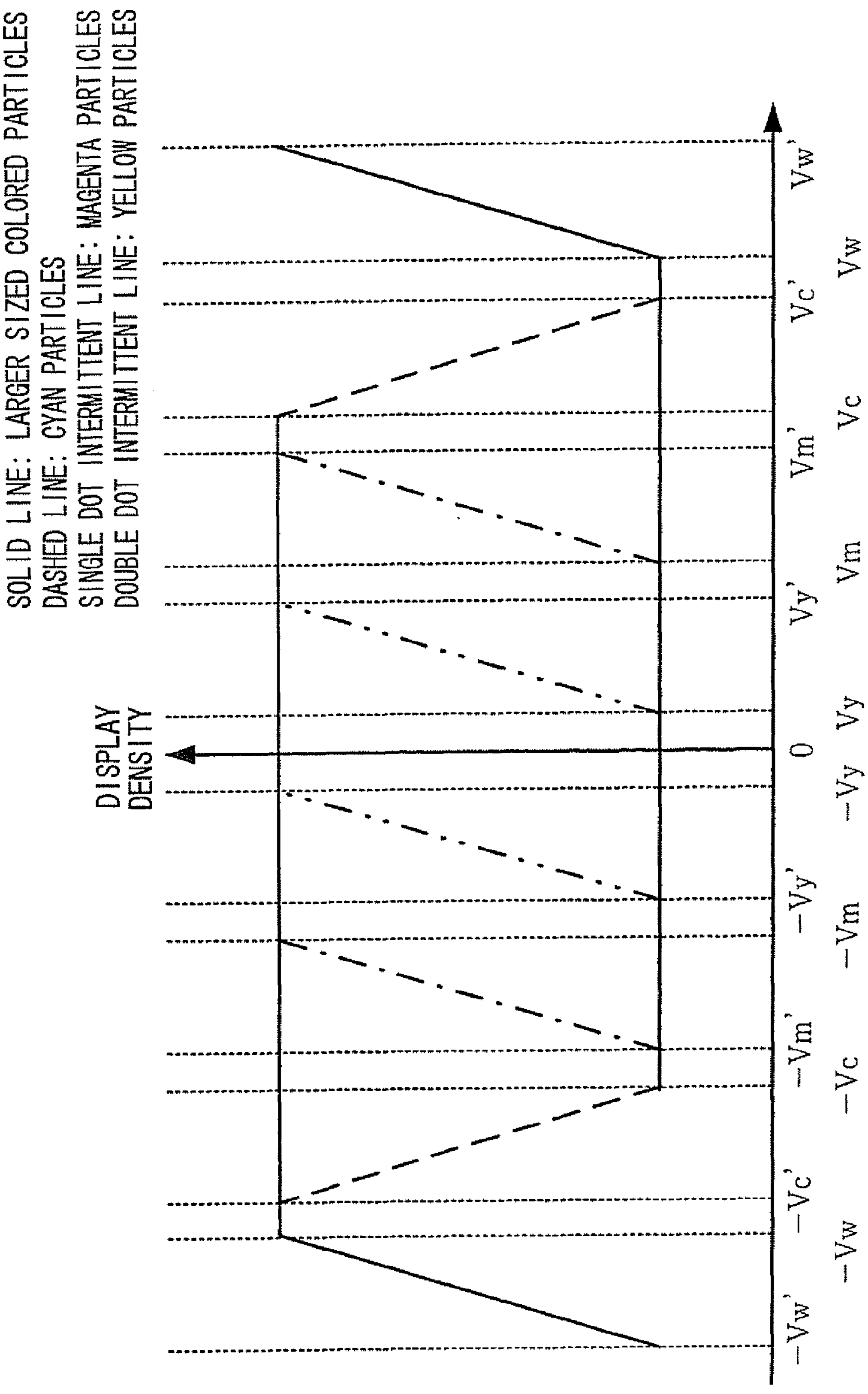
Figure 13A:
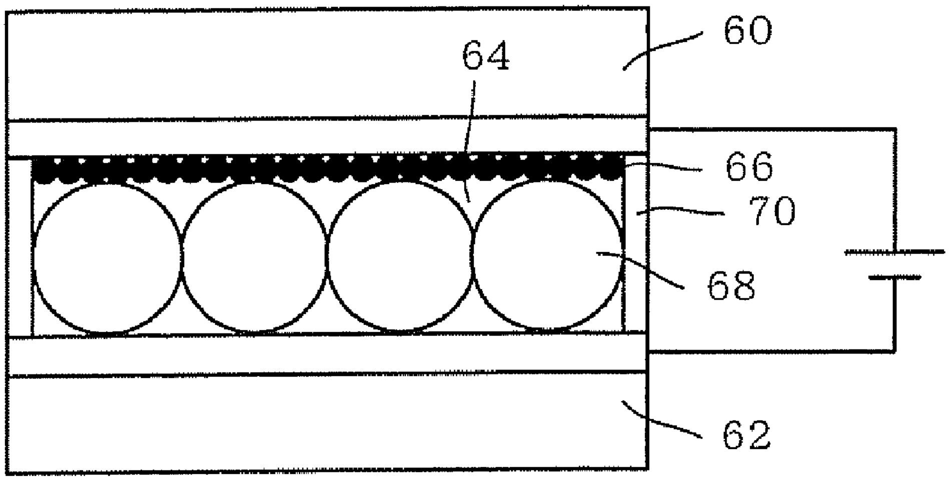
FIG. 13A RELATED ART
Figure 13B:
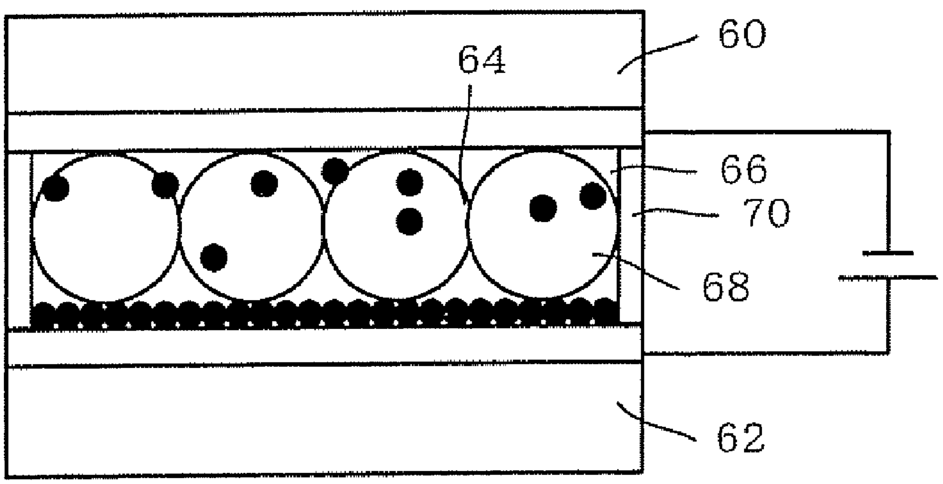
FIG. 13B RELATED ART

FIG, 7 is an outline block diagram showing an image display device according to a third exemplary embodiment of the present invention;

FIG. 8 is a figure showing an example of a driving method for the colored particles in the image display device according to the third exemplary embodiment of the present invention;

FIG. 9 is an outline block diagram showing an image display device according to a fourth exemplary embodiment of the present invention;

FIG. 10 is an outline block diagram showing an image display device according to a fifth exemplary embodiment of the present invention;

FIG. 11 is an outline block diagram showing an image display device according to a sixth exemplary embodiment of the present invention;

FIG. 12 is a graph showing movement characteristics of larger sized colored particles and movement characteristics of colored particles in the image display device according to the sixth exemplary embodiment of the present invention; and FIG. 13A and FIG. 13B are figures showing an example of an image display device of related art.

DETAILED DESCRIPTION

Examples of embodiments of the present invention will now be explained in detail, with reference to the drawings.

(First Exemplary Embodiment)

Figure 1:
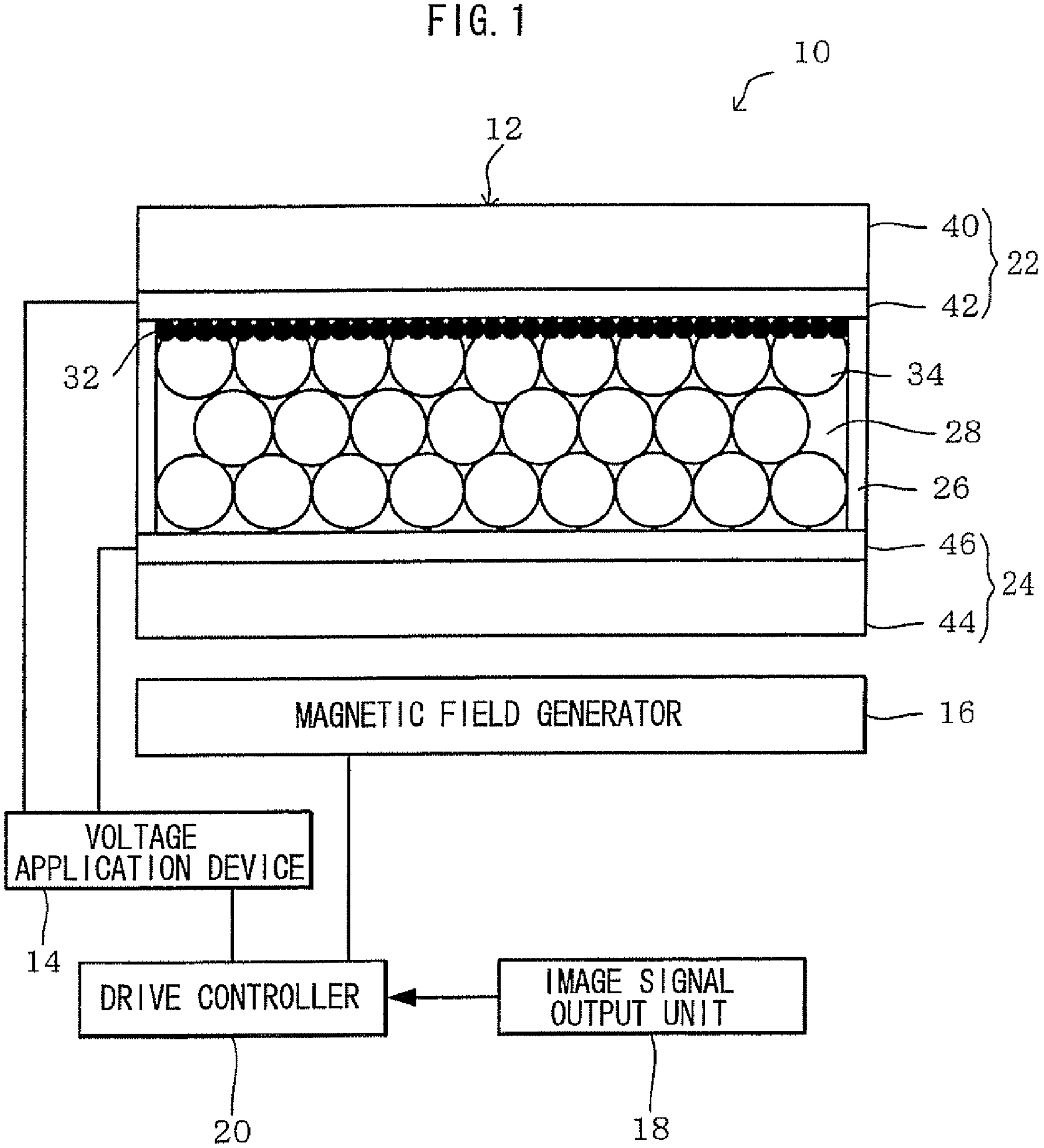
FIG. 1 is an outline block diagram showing an image display device according to a first exemplary embodiment of the present invention.

FIG. 1 is an outline block diagram showing an image display device according to a first exemplary embodiment of the present invention.

As shown in FIG. 1, an image display device 10 according to the present exemplary embodiment is configured to include an image display medium 12, a voltage application device 14, a magnetic field generator 16, and a drive controller 20. The image display medium 12 displays an image by migration of colored particles 32, described later The voltage application device 14 applies a voltage in order to display an image on the image display medium 12. The magnetic field generator 16 moves larger sized colored particles 34, described later. The drive controller 20 controls the driving of the voltage application device 14 and the driving of the magnetic field generator 16, in response to image display instructions from an external image signal output unit 1 8, such as a personal computer.

The image display medium 12 is configured to include a display substrate 22, a back substrate 24, and spacing members 26. The display substrate 22 is transparent and forms an image display surface. The back substrate 24 is placed opposing the display substrate 22 with a predetermined spacing thereto. The predetermined spacing between the substrates of the display substrate 22 and the back substrate 24 is maintained. The spacing members 26 divide into plural cells the space between the substrates of the display substrate 22 and the back substrate 24. It should be noted that a cell refers to a region that is surrounded by the display substrate 22, the back substrate 24, and the respective spacing members 26.

A transparent dispersion liquid 28 is enclosed in the cells. Colored particles 32 (described in detail later) that have been colored are enclosed in the dispersion liquid 28 and larger sized colored particles 34 that have a larger particle size than that of the colored particles 32 are also enclosed in the dispersion liquid 28. The colored particles 32 pass through the gaps between the larger sized colored particles 34 and migrate between the display substrate 22 and the back substrate 24 according to the electric field strength formed between the substrates.

It should be noted that the spacing members 26 may be provided so as to correspond to each pixel when displaying an image on the display medium 12, or the spacing members 26 may be provide so that plural pixels are included therebetween, of the spacing members 26 may be provided so that one pixel is divided across plural cells. Furthermore, in the present exemplary embodiment, explanation will be given using figures that focus on a single cell, in order to simplify the explanation.

The display substrate 22 includes a front electrode 42 formed on a supporting base 40. The back substrate 24 includes a back electrode 46 formed on a supporting base 44.

Moreover, the display substrate 22, or both the display substrate 22 and the back substrate 24, are transparent. Transparency in the present exemplary embodiment refers to the transmissivity of visible light being 70% or greater, and preferably 90% or greater.

Materials such as glass and plastics, may be used for the supporting bases 40, 44, for example, a polycarbonate resin, an acrylic resin, a polyimide resin, a polyester resin, an epoxy resin, a polyethersulfone resin, or the like may be used.

The following may be used for the front electrode 42 and the back electrode 46; metal oxides, such as oxides of indium, tin, cadmium, and antimony; composite oxides, such as ITO; metals, such as gold, silver, copper, and nickel; organic materials, such as polypyrrole, and polythiophene; and the like. These may be used in the form of a single layer film, mixed film or composite film, and may be formed by a vacuum deposition, sputtering, coating method, or the like. Moreover, the thickness of such an electrode according to a vacuum deposition or a sputtering method is usually 100 to 2000 Å.

The front electrode 42 and the back electrode 46 may be formed with a desired pattern, such as a matrix form or stripes that enable passive matrix driving, using a conventional method, such as by using a conventional liquid crystal display element or a printed circuit board etching process.

It should be noted that the front electrode 42 may be embedded in the supporting base 40, and the back electrode 46 may similarly be embedded in the supporting base 44. In such cases, since the material of the supporting bases 40, 44 may affect the electrical properties or magnetic characteristics and the flowability of the colored particles 32 and the larger sized colored particles 34, it is necessary to choose the material of the supporting bases 40, 44 according to the compositions and other such features of the respective particles.

Moreover, the front electrode 42 and the back electrode 46 may be separated, respectively, from the display substrate 22 and the back substrate 24, and disposed at an exterior portion of the image display medium 12. Although the present exemplary embodiment describes a case with electrodes (the front electrode 42 and the back electrode 46) provided on both the display substrate 22 and the back substrate 24, respectively, configurations are possible in which only one or other thereof is provided.

Moreover, in order to enable active-matrix driving, the supporting bases 40, 44 may be provided with TFTs (thin-film transistors) for every pixel. In such cases, the TFTs are preferably formed to the back substrate 24, rather than to the display substrate 22, since this facilitates laminating wiring and component mounting.

It should be noted that the image display device 10 may be configured simply if the image display medium 12 is driven by simple matrix driving. If the image display medium 12 is active-matrix driven using TFTs, then display speeds may be increased with respect to simple matrix driving.

Moreover, when the front electrode 42 and the back electrode 46 are respectively formed on the supporting bases 40, 44, it is preferable to form, as required, surface dielectric film layers on the front electrode 42 and the back electrode 46, respectively, in order to prevent the generation of interelectrode electrical leakage which causes damage to the front electrode 42 and the back electrode 46, and cause impaction of the colored particles 32. Examples of the material that forms such a surface layer include polycarbonates, polyesters, polystyrenes, polyimides, epoxies, polyisocyanates, polyamides, polyvinyl alcohols, polybutadiene, polymethylmethacrylate, nylon copolymers, ultraviolet curing acrylic resins, fluororesins and the like.

For configuring such a dielectric film, as well as the above materials, charge-transporting materials may also be included within these materials. Examples of such charge-transporting materials include hole-transporting materials such as hydrazone compounds, stilbene compounds, pyrazoline compounds, arylamine compounds, and the like. Moreover, electron-transporting materials may be used such as fluorenone compounds, diphenoquinone derivatives, pyran compounds, zinc oxide and the like. Furthermore, self supporting resins which have charge transporting properties may also be used. Specific examples thereof include polyvinyl carbazole, polycarbonates obtained by polymerization of a specific dihydroxy arylamine and bischloroformate, as described in U.S. Pat. No. 4,806,443, and the like. Moreover, since the dielectric film surface layer may affect the charge characteristics and flowability, of the colored particles 32 and the larger sized colored particles 34, the dielectric film surface layer may be chosen according to the compositions and other such features of the colored particles 32 and the larger sized colored particles 34.

Moreover, transparent materials from the above materials are used, for the display substrate 22, since, as mentioned above, the display substrate 22 as a component of the image display medium 12 should have transparency.

The spacing members 26 may be formed from thermoplastic resins, thermosetting resins, electron beam curing resins, photo-curing resins, rubber, metals, or the like. Moreover, the spacing members 26 may be made integral to one or other of the display substrate 22 or the back substrate 24. In such cases, production may be carried out by: an etching process which etches one or other of the supporting bases 40, 44; a laser erosion process; or press processing using a mold that has been manufactured in advance: or the like. Alternatively, production may also be carried out using a printing method, an inkjet method, or the like. It should be noted that the spacing members 26 may be formed on one or other of the display substrate 22 or the back substrate 24, or on both.

Moreover, although the spacing members 26 may be colored or colorlessness, it is preferable that the spacing members 26 are colorless, or transparent and colorless, so as not to have an adverse affect on display images displayed on the image display medium 12, and in such cases, for example, transparent resins, such as polystyrene, polyester, and acrylic resins and the like may be used.

It is preferable that the dispersion medium 28, by which the colored particles 32 are dispersed, is a high resistance liquid Here, "high resistance" means that the volume resistivity is $10^7$ Ω·cm or greater, preferably $10^{10}$ Ω·cm or greater and more preferably $10^{12}$ Ω·cm or greater.

Specific examples of liquids that may be appropriately used as such a high resistance liquid include hexane, cyclohexane, toluene, xylene, decane, hexadecane, kerosene, paraffin, isoparaffin, silicone oils, dichioroethylene, trichloroethylene, perchloroethylene, high grade petroleum, benzine, diisopropylnaphthalene, olive oil, trichlorofluoroethane, tetrachloroethane, dibromotetrafluoroethane, and the like, and mixtures thereof.

It should be noted that although acids, alkalis, salts, dispersion stabilizers, stabilizers for purposes such as anti-oxidation and/or ultraviolet absorption, antibacterial agents, preservatives, and the like may be added, as required, to the high resistance liquid, additions are preferably made such that the volume resistance value falls within the specific ranges shown above.

Moreover, anionic surfactants, cationic surfactants, amphoteric surfactants, nonionic surfactants, fluorochemical surfactants, silicone based surfactants, metallic soaps, alkyl phosphoric acid esters, succinimides, and the like may be added to the high resistance liquid as charge control agents.

More specifically, the following may be given as specific examples of ionic and nonionic surfactants. Examples that may be given of nonionic surfactants include polyoxyethylene nonylphenyl ether, polyoxyethylene octylphenyl ether, polyoxyethylene dodecylphenyl ether, polyoxyethylene alkyl ether, polyoxyethylene fatty acid esters, sorbitan fatty acid esters, polyoxyethylene sorbitan fatty acid esters, fatty acid alkylol amides and the like. Examples that may be given of anionic surfactants include: alkylbenzene sulfonates, alkylphenyl sulfonates, alkyl naphthalenesulfonates, higher fatty acid salts, sulfuric ester salts of higher fatty acid esters, sulfonates of higher fatty acid esters, and the like. Examples that may be given of cationic surfactants include primary, secondary and tertiary amine salts, quaternary ammonium salts and the like. These charging-control materials are preferably contained at from 0.01% by weight to 20% by weight, with respect to the particle solid content, with from 0.05% by weight to 10% by weicght being particularly preferable. When the amount of these charging-control materials is less than 0.01% by weight then the desired charging-control effect may be insufficient, and if 20% by weight is exceeded then this may cause an excessive rise in the electric conductivity of the dispersion liquid.

Examples that may be given of particles for the respective colored particles 32 dispersed in the dispersion medium 28 include: glass beads; metallic oxide particles, such as alumina, and titanium oxide; thermoplastic or thermosetting resin particles; such resin particles with a colorant adhered to the surface thereof; such thermoplastic or thermosetting resin particles containing a colorant therein; metal colloid particles that exhibit color strength due to surface plasmon resonance; and the like.

The following may be given as examples of thermoplastic resins that may be used for preparation of the particles, homopolymers and copolymers of: styrenes, such as styrene and chlorostyrene; monoolefines such as ethylene, propylene, butylene and isoprene; vinyl esters such as vinyl acetate, vinyl propionate, vinyl benzoate and vinyl butyrate; esters of α-methylene aliphatic monocarboxylic acid, such as methyl acrylate, ethyl acrylate, butyl acrylate, dodecyl acrylate, octyl acrylate, phenyl acrylate, methyl methacrylate, ethyl methacrylate, butyl methacrylate, dodecyl methacrylate; vinyl ethers, such as vinyl methyl ether, vinyl ethyl ether, and vinyl butyl ether; vinyl ketones, such as, vinyl methyl ketone, vinyl hexyl ketone, and vinyl isopropenyl ketone; and the like.

Moreover, the following may be used as thermosetting resins for preparation of the particles: cross-linking resins, such as cross-linking, copolymers which use divinylbenzene as a principal component, and cross-linking polymethylmethacrylate; phenol resins; urea resins; melamine resins; polyester resins; silicone resins; and the like. In particular, typical examples of binder resins include polystyrene, styrene- alkyl acrylate copolymers, styrene alkyl methacrylate copolymers, styrene acrylonitrile copolymers, styrene-butadiene copolymers, styrene- maleic anhydride copolymers, polyethylene, polypropylene, polyesters, polyurethanes, epoxy resins, silicone resins, polyamides, modified rosins, paraffin waxes, or the like.

Organic and inorganic pigments and oil-soluble dyes may be used as colorants. Typical examples thereof include known colorants, such as the following: magnetic powders, such as magnetite and ferrite; carbon black; titanium oxide; magnesium oxide; zinc oxide; copper phthalocyanine-containing cyan coloring materials; azo-containing yellow coloring materials, azo-containing magenta coloring materials; quinacridone-containing, magenta coloring materials; red color materials green color materials, and blue color materials; and the like. Specifically, the following may be used: aniline blue, chalcoil blue, chrome yellow, ultra marine blue, DuPont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, C.I. pigment blue 15:3 and the like.

Charge control agents may be mixed into particle resins, as required. Known charge control agents for use in electrophotographic toner materials may be used, examples of which include: quaternary ammonium salts, such as cetylpyridyl chloride, BONTRON P-51, BONTRON P-53, BONTRON E-84, BONTRON E-81 (trade names; made by Orient Chemical Industries, Ltd.,) and the like; salicylic acid-containing metal complexes, phenol condensates, tetraphenyl compounds, metal oxide particles, and the metal oxide particles to which surface treatment has been carried out with various coupling agents; and the like.

External additives may, as required, be adhered to the surface of the particles. Regarding the color of such external additives, transparent external additives are preferable so that the color of the particles is not affected. As such external additives, inorganic particles may be used, such as metal oxides, such as silicon oxide (silica), titanium oxide, alumina, and the like. Surface treatment may be carried out to the particles with a coupling agent or silicone oil in order to adjust the electrostatic properties of the particles, their flowability, their environment dependency, and the like. Examples that may be given of such coupling agents include: agents for positive charge characteristics, such as aminosilane coupling agents, amino titanium coupling agents, and nitrile coupling agents; agents for negative charge characteristics, such as silane coupling agents, titanium coupling agents, epoxysilane coupling agents, and acrylic silane coupling agents which do not contain a nitrogen atom (consisting of atoms other than nitrogen). Furthermore, the following may be given as examples of silicone oils: those with positive charge characteristics, such as amino modified silicone oils, and the like; and those with negative charge characteristics, such as dimethyl silicone oils, alkyl modified silicone oils, α-methylsulfone modified silicone oils, methylphenyl silicone oils, chlorophenyl silicone oils, and fluorine modified silicone oils, and the like.

Among the above external additives, well known hydrophobic silica and hydrophobic titanium oxide are preferable, and especially suitable are titanium compounds obtained by the reaction, as described in JP-A No. 10-3177, of $TiO(OH)_2$ with silane compounds, such as a silane coupling agent. Chlorosilanes, alkoxy silanes, silazanes, and speciality silylation reagents may all be used as such silane compounds. Such a titanium compound may be produced by reacting $TiO(OH)_2$ produced in a wet process with a silane compound or a silicone oil, and drying. Since the Ti atoms do not endure a baking process of several hundreds of decrees, there is no strong binding formed between the Ti atoms, there is no aggregation, and the particles are in the state of primary particles. Furthermore, since $TiO(OH)_2$ is directly reacted with a silane compound or silicone oil, the amount of silane compound or silicone oil for treatment may be increased, and charge characteristics may be controlled such as by adjusting the amount of silane compound for treatment, and significantly improved charging ability may be imparted thereto in comparison to conventional titanium oxide.

The primary particle size of external additives is generally from 5 to 100 nm, and preferably from 10 to 50 nm, however there is no limitation thereto.

The compounding ratio of external additives to the particles is adjusted from the balance of the size of the particles to the size of the external additive. Apart of external additives separate from the particle surface if too much external additive is added, and the separated external additives then adheres to the surface of other particles, and the desired charge characteristics may not be obtainable. The quantity of external additives is generally from 0.01 to 3 parts by weight with respect to 100 parts by weight of the particles, with 0.05 to 1 part by weight being preferable.

It should be noted that external additives may be added to only one of plural kinds of particle, or external additives may be added to plural kinds of, or all kinds of, the particles. When adding external additives to the surface of all the particles, it is preferable to drive external additives into the surface of the particles by impactive force, or to heat the surface of the particles so as to anchor the external additives to the surface of the particles firmly. Accordingly, it may be prevented that external additives separate from the particles, external additives of opposite polarity aggregates strongly, aggregates of external additives which hardly dissociate in an electric field are formed, and consequently image quality deterioration may be prevented.

Conventionally known methods may be used as the method for producing the colored particles 32. For example, as described in JP-A No. 7-325434, a method may be used in which: resin(s), pigment(s), and charge control agents are measured out to the predetermined mixing ratio; after carrying out heat and melting of the resin(s), the pigment(s) are added thereto, and mixed and dispersed; then, after cooling, particles are prepared by using a pulverizer, such as a jet mill, a hammer mill, a turbo mill, or the like; and the obtained particles are then dispersed in a dispersion medium. Moreover, particles may be prepared that contain charging control agent(s) in the particles, by polymerizing methods, such as suspension polymerization, emulsion polymerization, and dispersion polymerization, and with coacervation, melt dispersion, and emulsion aggregation methods, and these particles may then be dispersed in a dispersion medium, so as to form a particle dispersion medium. Furthermore, there is a method that uses an appropriate device that can disperse and knead raw materials including the resin, a colorant, a charging control agent, and a dispersion medium at a temperature where a resin is able to be plasticized, and the dispersion medium does not boil, and that is lower than the decomposition temperature of the resin, the charging control agent, and/or the colorant. Specifically, heat melting may be carried out of the resin and the charging control agent together with the pigment in the dispersion medium using a planetary type mixer, a kneader, or the like. Then using the temperature dependency of the solvent solubility of the resin, the molten mixture may be cooled while it is being stirred, and particles may be prepared by coagulation/precipitation therefrom.

There is no particularly limit to the amount contained (weight %) of the colored particles 32 with respect to the total weight in a cell, as long as the desired hue can be obtained at that density, and the amount contained may be adjusted according to the thickness of the cells (namely, the distance between the substrates, between the display substrate 20 and the back substrate 22). That is, in order to acquire a desired hue, the amount contained decreases as a cell becomes thicker, and the amount contained increases as a cell becomes thinner. Generally, the amount contained of the colored particles 32 is from 0.01 weight % to 50 weight %.

There is no particular limit with regard to the size of the above cells in the image display medium 12, however, in order to prevent non-uniformity of the display density due to uneven distribution of the colored particles 32 within the display surface, the dimensions of the cells along the direction of the plate surface of the display substrate 22 of the image display medium 12 are preferably set to about 0.1 mm to about 10 mm.

Moreover? examples that may be given of the larger sized colored particles 34, which are disposed so as to be able to migrate between the display substrate 22 and the back substrate 24, include: glass beads; metallic oxide particles, such as alumina, and titanium oxide; thermoplastic or thermosetting resin particles; such resin particles with a colorant adhered to the surface thereof; thermoplastic or thermosettingc resin particles containing a colorant therein; and the like. It should be noted for a thermoplastic resin or a thermosetting resin used for preparation of the larger sized colored particles 34, appropriate selection may be made from the same sorts of resins as those usable in the colored particles 32. Moreover, as a colorant used for preparation of the larger sized colored particles 34, the colorant may be selected from those usable for the colored particles 32. Moreover, as a method for producing the larger sized colored particles 34, any conventionally known method may be used, similarly to the production of the colored particles 32.

Moreover, the larger sized colored particles 34 of the present exemplary embodiment have magnetic materials mixed inside and/or on the surface of the particles. Known magnetic materials may used therefor, such as iron oxide, iron nitride, carbon steel, ferrite, samarium, and the like. Moreover, color coating of the magnetic materials may be carried out as required. Moreover, transparent magnetic materials, especially transparent organic magnetic materials are more preferable since they do not interfere with the coloring of pigment colorants, and their specific gravity is also low compared to that of inorganic magnetic materials. As colored magnetic powder, for example, the small size coloring magnetic powders described in JP-A No. 2003-131420 may be used. Particles in which magnetic particle are used as a nucleus, and a coloring layer is layered onto this magnetic particle surface may be used. A pigment or the like may be used as such a coloring layer for coloring the magnetic powder so that it does not transmit light therethrough. Moreover, for example, it is also preferable to use an interference thin film as a coloring layer. Such an interference thin film is a thin film of a colorless material, such as $SiO_2$ and $TiO_2$, having comparable thickness to light wavelength, and the thin film reflects light in a wavelength-selective manner due to light interference within the thin film.

It is preferable to include material with a higher specific gravity than binder resin (such as for example, titanium oxide, magnetic powder) in the larger sized colored particles 34, and by including material with a high specific gravity, the reduction of density and color turbidity, when the color of the larger sized colored particles 34 is displayed, may be suppressed.

The size (volume average particle size) of each of the particles of the larger sized colored particles 34 is such that the colored particles 32 are able to migrate through the gaps between the larger sized colored particles 34. Therefore, it is preferable that the larger sized colored particles 34 are 10 times the size of the colored particles 32 or greater, and it is preferable that the size is 20 times or greater when the dispersion of the particle size of respective coloring-particle groups is large. In such cases, the colored particles 32 may migrate well through the gaps between the larger sized colored particles 34, without getting blocked.

Image display with high resolution may be performed when the size of the colored particles 32 is small, however, migration speed is reduced and display switching speed is also reduced, and it becomes difficult to combine memory characteristics of the display with the stability of the dispersion. Therefore a size of 20 nm to 10 μm is preferable.

Moreover, the larger sized colored particles 34 may be disposed so that there is one layer between the display substrate 22 and the back substrate 24, but plural layers are preferable since higher concealment ability may be obtained by arranging plural layers. When the size of the larger sized colored particles 34 increases, the distance between the substrates also increases, with an increase in the display driving voltage and a reduction in the display switching speed occurring, therefore in such cases the larger sized colored particles 34 are preferably 50 μm or less, and more preferably 30 μm or less.

The front electrode 42 of the display substrate 22 and the back electrode 46 of the back substrate 24 are connected to the voltage application device 14, as described above, and the voltage application device 14 is connected to the drive controller 20. The drive controller 20 is connected to the external image signal output unit 18, such as a personal computer. By the drive controller 20 outputting the signal, according to image information and the like, to the voltage application device 14, and by the voltage application device 14 applying the voltage according to the image to the front electrode 42 and the back electrode 46, a desired electric field is formed between the front electrode 42 and the back electrode 46, and the colored particles 32 migrate between the substrates.

It should be noted that when the display substrate 22 and/or the back substrate 24 do not have an electrode, an electrode head may be disposed adjacent to the display substrate 22 and/or the back substrate 24, voltage may be applied to the electrode head with the voltage application device 14, and a desired electric field may be formed between the display substrate 22 and the back substrate 24. Such an electrode head may have plural electrodes arrayed in a plane or in lines at the desired size and pitch, and well known electrode heads may be used. It should be noted that it is preferable to dispose a similar electrode head, or a uniform electrode, adjacent to the back face of the substrate on the opposite side to the side at which the above electrode head is disposed, so as to configure a counter electrode configuration, in terms of the reduction of driving voltage and the increase in resolution.

The magnetic field generator 16 is disposed at the back substrate 24 side of the image display medium 12, and is connected to the drive controller 20. The drive controller 20 outputs a signal, according to the image initialization information on the image display medium 12, to the magnetic field Generator 16, a desired magnetic field is formed by the magnetic field generator 16 between the display substrate 22 and the back substrate 24, and the larger sized colored particles 34 migrate between the substrates.

It should be noted that the magnetic field generator 16 may be any field generator that is able to form the desired magnetic field between the display substrate 22 and the back substrate 24 of the image display medium 12. For example, a magnetic recording head may be used of a planer shape or as lines arranged adjacent to each other at a desired pitch, with an electromagnet using a high permeability magnetic material or a permanent magnet as a core with a coil wound around the periphery thereof. In such cases, the magnetic polarity and the magnetic force may be controlled by controlling the direction and quantity of the electric current passing through the coil of each electromagnet.

Moreover, when a magnetic recording head which has a head area smaller than the display range area of the image display medium 12 is used for the magnetic field generator 16, the magnetic recording head may be moved along the surface over the image display medium 12, or the magnetic recording head may be fixed and the image display medium 12 may be moved.

Moreover, a permanent magnet may be used rather than an electromagnet for the magnetic recording head of the magnetic field generator 16. In such cases the magnetic field which acts on the image display medium 12 may be varied by moving such a permanent magnet relative to the image display medium 12.

Moreover, a magnetic field generator 16 may be disposed to the display substrate 22 side of the image display medium 12. Two magnetic field generators 16 may be disposed with the image display medium 12 sandwiched between thereof An example of a still more specific configuration of the above image display device 10 will now be explained.

In FIG. 1, the display substrate 22 is formed with an ITO film of thickness 50 nm formed with a sputtering method as a transparent front electrode 42 on one side of the transparent supporting base 40 configured from 0.7 mm thick glass. Then polycarbonate resin is coated to the face of the front electrode 42 so as to be about 0.5 μm in thickness. The thickness of this surface layer is measured by a laser scanning microscope (trade name: OLS1100; made by OLYMPUS CORPORATION). Moreover, the average surface roughness is measured at the same time and is found to be an Ra of 0.2 μm.

Figure 2:
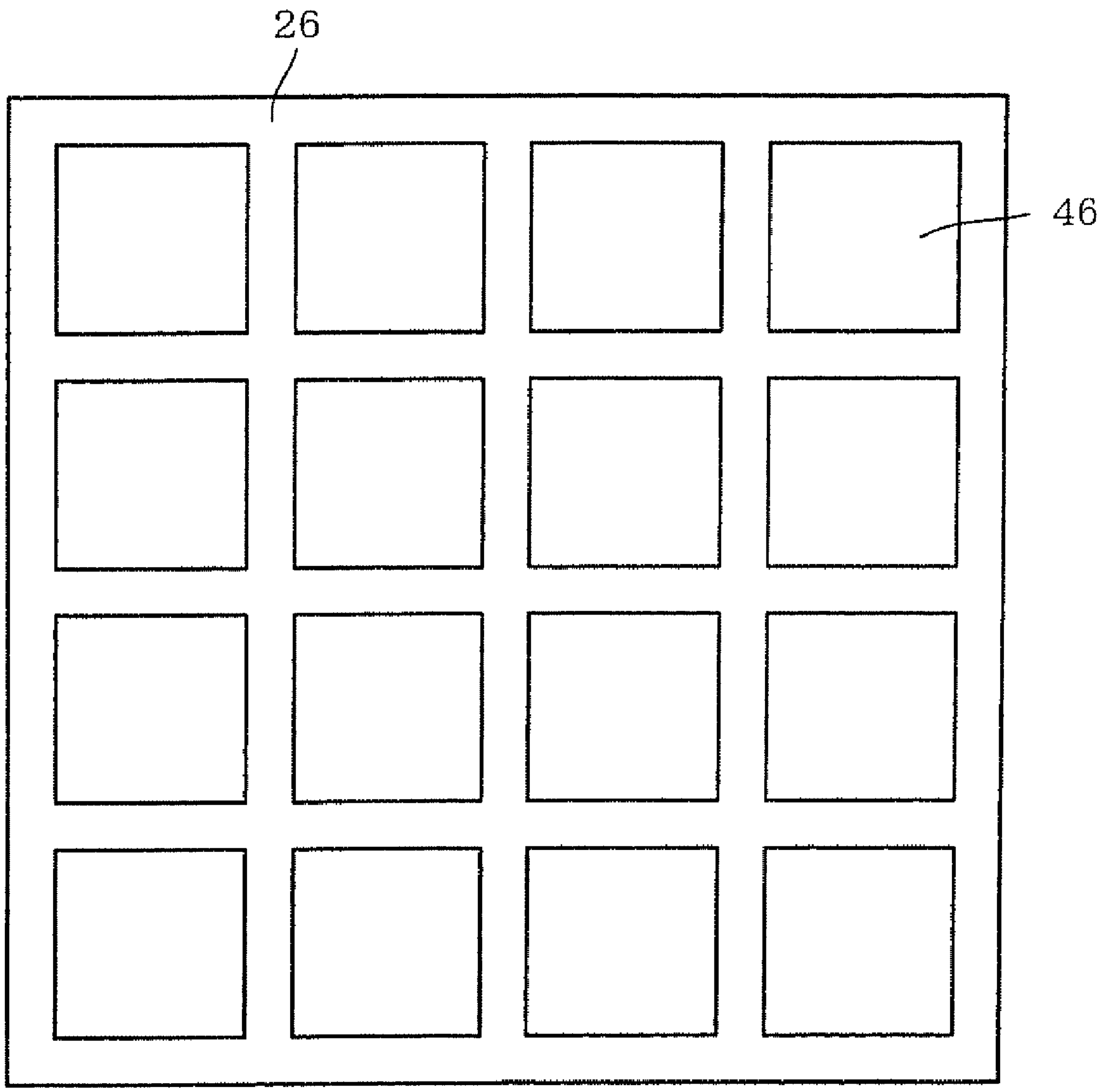
FIG. 2 is a figure showing an example of a back substrate of the image display device according to the first exemplary embodiment of the present invention.

An 8 μm thick copper foil is laminated and fixed as the back electrode 46 to the back substrate 24 using a 0.7 mm thickness of glass epoxy resin. Moreover, as shown in FIG. 2, an etching process is carried out on the copper foil of the back electrode 46, and plural pixel electrodes are configured. The dimensions of the sides of the pixel electrodes are 2.45 mm and the spacing between each pixel electrode is 50 μm. It should be noted that the glass epoxy resin substrate has conduction-pretreated through holes formed at positions corresponding to each of the pixel electrodes, and electric leads are taken out from the back side of a supporting base 44 through these through holes.

Then, after coating an epoxy resin (trade name: SU-8; made by MicroChem Corporation) to the face of the back substrate 24 on which the back electrode 46 is provided, the spacing members 26 are formed of 50 μm in height and 50 μm in width by performing photo exposure and wet etching treatments, to give a lattice of 10 mm squares. FIG. 2 represents a single cell surrounded by the spacing members 26, in order to simplify explanation.

Next, coating formation of an epoxy adhesive for thermal fusion bonding is carried out at the upper portions of the spacing members 26. Then, the cells on the back substrate 24, which are divided by the spacing members 26, are uniformly filled with the larger sized colored particles 34. A dispersion liquid, in which the colored particles 32 are dispersed in the transparent dispersion medium 28, is then filled to the height of the spacing members 26. As an alternative, a dispersion liquid, in which the larger sized colored particles 34 and the colored particles 32 have been mixed and dispersed in the transparent dispersion medium 28, may be filled to the height of the spacing members 26.

Finally, the face of the display substrate 22 on which the front electrode 42 is provided is stuck tightly to the spacing members 26 provided on the back substrate 24, while heating, so that air cannot penetrate in between the substrates, and the image display medium 12 is produced.

In this situation, the larger sized colored particles 34 are not fixed but may migrate within the cells according to external forces. The degree of migration of the larger sized colored particles 34 may be controllable by the fill amount of the larger sized colored particles 34 disposed in the cells. In order to facilitate migration of the larger sized colored particles 34 and to increase the amount of movement, the fill amount of the larger sized colored particles 34 may be decreased. However, if the fill amount is too small, the concealment ability will fall and uneven distribution within the cells will readily develop. On the contrary, if the fill amount of the larger sized colored particles 34 is too high, since migration of the larger sized colored particles 34 does not readily occur, and the amount of movement also becomes small, it becomes difficult to obtain the effect of the present invention. Therefore, the fill ratio of the larger sized colored particles 34 is preferable from 30% to 60% with respect to the cell internal volume.

The larger sized colored particles 34 are produced as explained below.

A dispersion liquid A is produced by carrying out ball milling for 20 hours using 10 mm diameter zirconia balls to: 53 parts by weight of cyclohexyl methacrylate; 30 parts by weight of titanium oxide (trade name:TIPAQUE CR-63; made by Ishihara Sangyo Kaisha, Ltd.); 30 parts by weight of white coated magnetite; and 5 parts by weight of cyclohexane. A calcium carbonate dispersion liquid B is produced by pulverizing 40 parts by weight calcium carbonate with 60 parts by weight of water, using a ball mill. A mixed liquid C is produced by mixing 4.3 g of 2% cellogen aqueous solution, 8.5 g of calcium carbonate dispersion liquid B, and 50 g of 20% brine, degassing for 10 minutes with an ultrasonic machine, and agitating in an emulsifier. 35 g of dispersion liquid A, 1 g of divinylbenzene, and 0.35 g of polymerization-initiator azobisisobutyronitrile (AIBN) are sufficiently mixed together and degassed with an ultrasonic machine for 10 minutes. The resultant is put into the mixed liquid C and emulsified with an emulsifier.

Next, this emulsified liquid is put into a bottle, capped with a silicone bung, an injection needle is used to carry out sufficient pressure reduction and deairing, and then nitrogen gas is injected. Next, particles are produced by reacting at 60° C. for 10 hours. After cooling, cyclohexane is removed from this dispersion liquid for two days at −35° C. and 0.1 Pa in a freeze dryer. The obtained fine particle powder is dispersed in ion exchange water, and calcium carbonate is decomposed in aqueous hydrochloric acid, and filtering is carried out. Then the product is washed with sufficient distilled water, particle sizes are sorted, and the particles dried. The color of the larger sized colored particles 34 is white, and the volume average particle size thereof is 15 μm.

It should be noted that, in addition to the above example, the following may be used as white larger sized colored particles 34: spherical particles of a benzoguanamine-formaldehyde condensate; spherical particles of a benzoguanamine-melamine-formaldehyde condensate; spherical particles of a melamine-formaldehyde condensate (trade name: EPOSTAR; made by Nippon Shokubai Co., Ltd.); spherical particles of titanium oxide-containing cross-linked polymethylmethacrylate (trade name: MBX-WHITE; made by Sekisui Plastics Co., Ltd.); spherical particles of cross-linked polymethylmethacrylate (trade name: CHEMISNOW-MX; made by Soken Chemical & Engineering Co., Ltd.); particles of polytetrafluoroethylene (trade name: LUBRON L; made by Daikin Industries Ltd., and trade name. SST-2; made from Shamrock Technologies Inc.); particles of carbon fluoride (trade name: CF-100; made by Nippon Carbon Co., Ltd. and trade names: CFGL, CFGM; made by Daikin Industries Ltd.); silicone resin particles (trade name: TOSPEARL; made by Toshiba Silicone Co., Ltd.); particles of titanium oxide containing polyester (trade name: Biryushia PL1000 WHITE T; made by Nippon Paint Co., Ltd.); titanium oxide containing polyester acrylic particles (trade name: KONAC No. 181000 WHITE; made by NOF Corporation); spherical particles of silica (trade name: HIPRESICA; made by UbeNitto Kasei); and the like.

Measurement of the volume average particle size of the larger sized colored particles 34 is performed as explained below.

When the particle diameter to be measured is 2 μm or larger, the particle size is measured using a coulter counter TA-II type as the measuring apparatus (trade name, made by Beckman Coulter Inc.) using ISOTON-II as the electrolyte (trade name, made by Beckman Coulter Inc.).

As the measuring method, from 0.5 to 50 mg of test sample is added into 2 ml of a surfactant aqueous solution, preferably sodium alkyl benzene sulfonate 5%, as the dispersant and this is added into 100 to 150 ml of the electrolyte. An ultrasonic dispersion machine is used to disperse the electrolyte, in which the test sample is suspended, for about 1 minute, and the particle size distribution of the particles in the range of particle size from 2.0 to 60 μm is measured with the coulter counter TA-II type using an aperture of diameter 100 μm. The number of particles measured is 50,000.

The measured particle size distribution is divided into particle size ranges (channels), and a cumulative distribution by volume is drawn up from the small diameter side, and the particle size at the cumulative 50% position is the volume average particle size.

The colored particles 32 are produced as explained below.

A dispersion liquid A is produced by carrying out ball milling of 53 parts by weight of cyclohexyl methacrylate; 10 parts by weight of carbon black pigment; and 2 parts by weight of a charging control agent (trade name. COPY CHARGE PSY VP2038; made by Clariant Japan), for 20 hours using 10 mm diameter zirconia balls. A calcium carbonate dispersion liquid B is produced by pulverizing 40 parts by weight calcium carbonate with 60 parts by weight of water, using a ball mill. A mixed liquid C is produced by mixing 4.3 g of 2% cellooen aqueous solution, 8.5 g of calcium carbonate dispersion liquid B, and 50 g of 20% brine, degassing for 10 minutes with an ultrasonic machine, and agitating in an emulsifier. 35 g of dispersion liquid A, 1 g of divinylbenzene, and 0.35 g of polymerization-initiator AIBN are sufficiently mixed together and degassed with an ultrasonic machine for 10 minutes. The resultant is put into the mixed liquid C and emulsified with an emulsifier Next, this emulsified liquid is put into a bottle, capped with a silicone bung, and then using an injection needle, sufficient reduced-pressure deairing is performed and nitrogen gas is injected. Next, reaction is carried out at 60° C. for 10 hours, and particles are produced. The obtained fine particle powder is dispersed in ion exchange water, the calcium carbonate is decomposed in aqueous hydrochloric acid, and filtering is carried out. The fine particle powder is then washed with sufficient distilled water, sorted by particle size, and then the particles are dried. 10 parts by weight of the obtained particles are placed, together with 2 parts by weight of nonionic surfactant polyoxyethylene alkyl ether (for giving positive charge to the particles), in 90 parts by weight of a silicone oil (octamethyl trisiloxane) as a transparent high resistance dispersion medium 28, stirred and dispersed, and a mixed liquid is obtained. The volume average particle size of the obtained black particles is 0.8 μm.

Measurement of the volume average particle size is carried out by irradiating the particle group with a laser beam and measuring using a particle size distribution analyzer (trade name: MICROTRAC MT3300; made by Nikkiso Co., Ltd.) which uses a laser light diffraction/scattering method that measures an average particle size from the intensity distribution pattern of diffracted light and scattered light.

A silicone oil with a viscosity of 2 mPa·s (trade name: KF-96; made by Shin-Etsu Chemical Co., Ltd.) is used as the dispersion medium 28. The viscosity of the dispersion medium 50 at 20° C. is preferably from about 0.1 mPa·s to 20 mPa·s from the standpoint of the migration speed of the particles, in other words from the standpoint of display speed, and 0.1 mPa·s to 10 mPa·s is more preferable, and 0.1 mPa·s to 5 mPa·s is still more preferable. Adjustment of the viscosity of the dispersion medium 28 may be carried out by suitable adjustments of the molecular weight, structure, composition and the like of the dispersion medium. Measurement of viscosity is conducted using a B-8L type viscometer (trade name, made by Tokyo Keiki Co., Ltd.).

In the silicone oil used as the dispersion medium 28, the white larger sized colored particles 34 are negatively charged and the black colored particles 32 are positively charged.

Explanation will now be given of the display method of the image display device 10 produced as described above.

A signal based on image initialization information is output to the magnetic field generator 16 from the drive controller 20 when an image display is displayed. The magnetic field generator 16 is thereby drive controlled, a magnetic field is formed between the substrates of the image display medium 12, and the magnetic larger sized colored particles 34 migrate between the substrates according to the magnetic field formed between the substrates.

Figure 3:
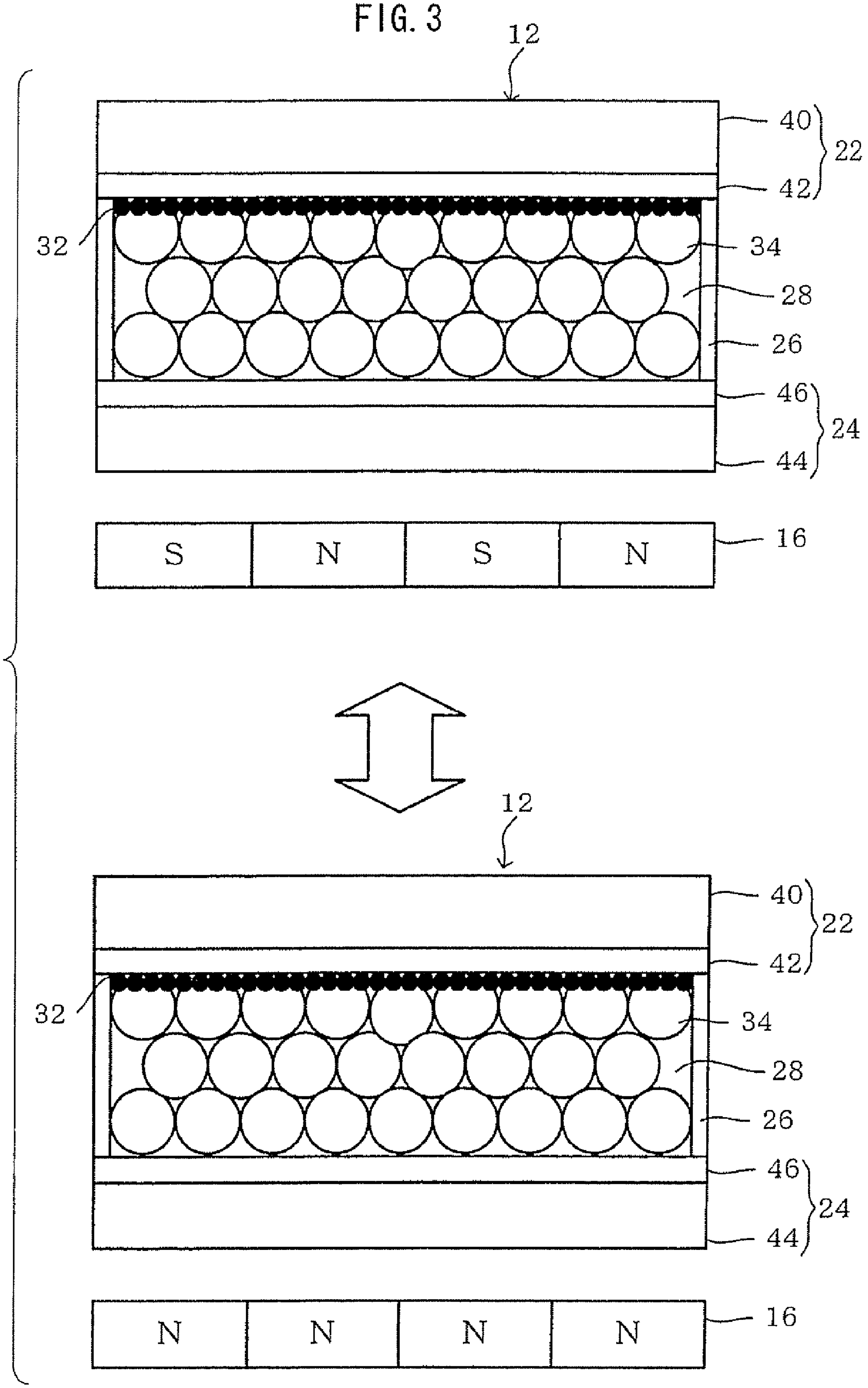
FIGS. 3 is a figure showing an example of polar control of a magnetic field generator in the image display device according to the first exemplary embodiment of the present invention.

In this example, a magnetic recording head that has electromagnets disposed in the shape of a lattice at a 2.5 mm pitch is used as the magnetic field generator 16, as shown in FIG. 3, and the alignments of the SN poles therein are changed with a constant period, changing the magnetic field that acts on the image display medium 12. Specifically, the alignments of the respective SN poles are changed 10 times at a frequency of 10 Hz. The larger sized colored particles 34 move between the substrates due to the action of the magnetic field. It should be noted that although FIG. 3 represents a case where one cell is divided into plural units for changing the magnetic field, the magnetic field may be changed for every cell without division, or the magnetic field of the whole surface of the back substrate 24 may be changed.

At the same time, a signal according to image information is output to the voltage application device 14 from the drive controller 20. The voltage application device 14 is thereby drive controlled, and a voltage is applied to the front electrode 42 of the display substrate 92 and to the back electrode 46 of the back substrate 24, and an electric field according to image information is thereby formed between the substrates. Accordingly, the colored particles 32 migrate between the substrates.

More specifically, first +20 V is applied to the back electrode 46 and 0 V is applied to the front electrode 42 for a duration of one second, and, after migrating the positively charged black colored particles 32 to the display substrate 22 side and displaying black, −20 V is applied to the back electrode 46 and 0 V is applied to the front electrode 42 for a duration of one second, and the positively charged black colored particles 32 are migrated to the back substrate 24 side, displaying white, and the reflectance thereof is measured. Measurement of the reflectance is carried out using a reflection density meter X-Rite 404 (trade name, made by X-Rite Incorporated) and the reflectance density is measured, and the reflectance is calculated from this value.

Moreover, after measuring the reflectance, +20 V is applied to the back electrode 46 and 0 V is applied to the front electrode 42, for a duration of one second again, and black is displayed and then, after leaving for a desired period of time (one minute, one hour, or one day), repeat measurements are carried out in a similar manner to above.

Figure 4A:
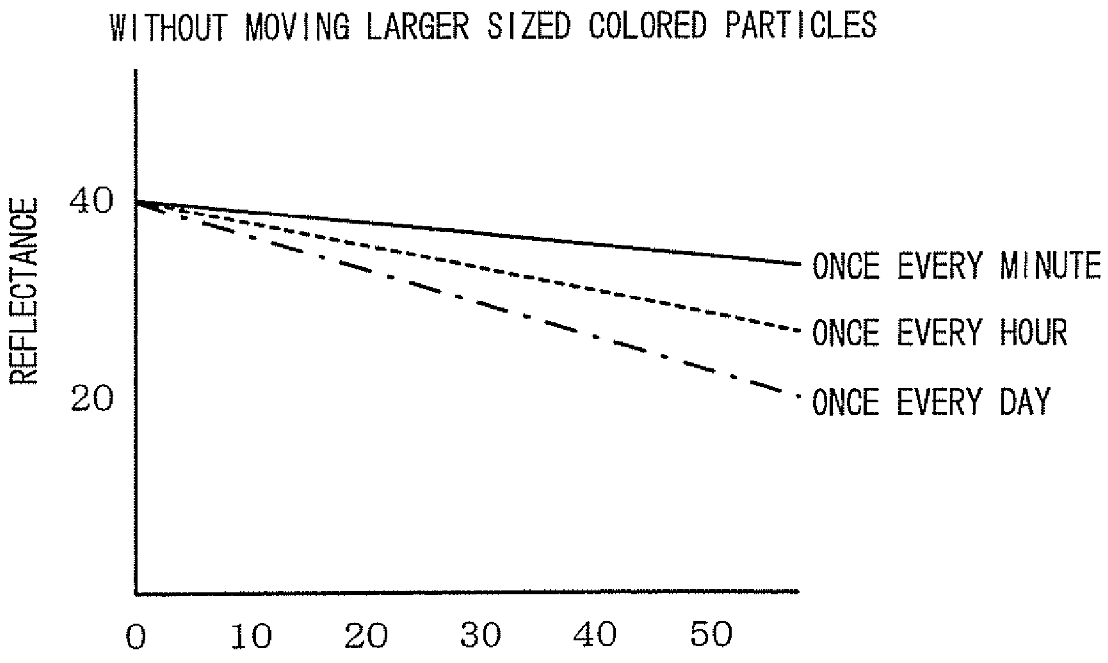
FIG. 4A and FIG. 4B are the graphs showing the relationship between the number of times of display and the reflectance at the time of white display in the image display device according to the first exemplary embodiment of the present invention.

When the larger sized colored particles 34 are not driven by the magnetic field generator 16, then, as shown in FIG. 4A, as the number of times of repeated display increases the white reflectance during white display gradually declines. Moreover, there is a remarkable reduction in white reflectance for the longer leaving times.

Figure 4B:
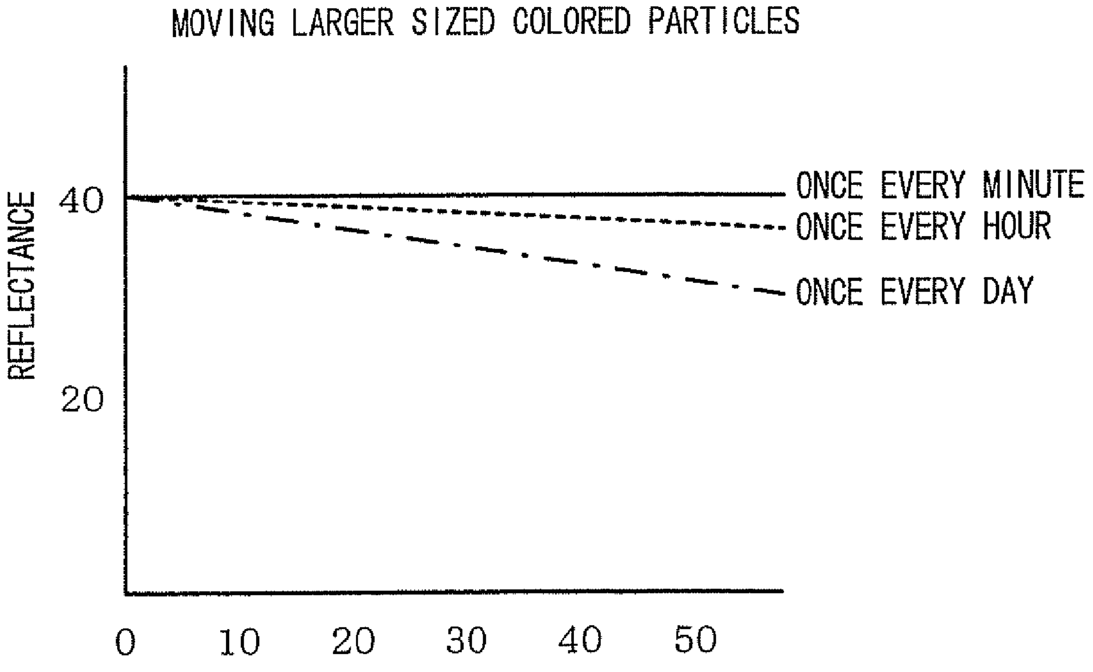

In contrast, when driving the larger sized colored particles 34 by the magnetic field generator 16 is performed simultaneously with driving the colored particles 32 by the voltage application device 14, as shown in FIG. 4B, an effect of preventing the decline in reflectance may be shown for all of the leaving times.

Next, the colored particles 32 are driven with the voltage application device 14 after driving the larger sized colored particles 34 with the magnetic field generator 16. The driving method of the larger sized colored particles 34 by the magnetic field generator 16, the driving method of the colored particles 32 by the voltage application device 14, and the measurement evaluation conditions are the same as those above. It should be noted that when the colored particles 32 are driven with the voltage application device 14, the larger sized colored particles 34 move slightly, but hardly migrate.

An effect of preventing decline in reflectance may also be shown with all of the leaving times using this method, similar to that when the driving of the larger sized colored particles 34 by the magnetic field generator 16 and the driving of the colored particles 32 by the voltage application device 14 are carried out at the same time. Furthermore, a high density homogeneity may be achieved when displaying black.

In other words, by making the larger sized colored particles 34 move, the colored particles 32 adhering to the larger sized colored particles 34 are separated, and the reduction in density or color turbidity may be suppressed.

Next, a case where driving of the larger sized colored particles 34 by the magnetic field generator 16 and driving of the colored particles 32 by the voltage application device 14 are carried out simultaneously is compared with a case where these actions are carried out sequentially, for the display of a black and white lattice image of alternating pixels, rather than when all the pixels display white or all the pixels display black.

Specifically, the display of a black and white lattice image of alternating pixels is performed by the voltage application device 14 as follows. The front electrode 42 is set to 0 V, and −20 V is applied to the back electrode 46 for a duration of one second for the pixels which display white, and +20 V is applied to the back electrode 46 for a duration of one second for the pixels which display black. Thereby, the positively charged black colored particles 32 migrate to the back substrate 24 side for the pixels which display white, and the positively charged black colored particles 32 migrate to the display substrate 22 side for the pixels which display black, and a black and white lattice image with alternating pixels is displayed.

The displayed black and white lattice image is magnified with an optical microscope, and visual evaluation is performed of the state of adhesion of the black colored particles 32 to the white larger sized colored particles 34 in the white pixels, and of the dot shape in the black pixels.

Although adhesion of the black particles to the white particles is hardly seen when the larger sized colored particles 34 are driven by the magnetic field generator 16 at the same time as the colored particles 32 are driven by the voltage application device 14, there are occasional pixels in which the dot shape of the black pixels is disrupted. On the other hand, when the larger sized colored particles 34 are driven by the magnetic field generator 16 and then the colored particles 32 are driven by the voltage application device 14, there is hardly any adhesion of the black particles to the white particles seen, the dot shape of the black pixel is also hardly disrupted, and the pixel electrode shape is substantially reproduced.

Next, the driving conditions of the magnetic field generator 16 are changed, and the preventive effect against a decline in the reflectance during white display is confirmed. Specifically, the same image display driving is performed as above with the number of times of change of alignment of the SN poles of the above magnetic recording head set at 5 times, 10 times, 20 times, and 500 times, and the white reflectance during white display is compared.

Specifically, first a signal according to image information is output to the voltage application device 14 from the drive controller 20, and a voltage is applied to the front electrode 42 of the display substrate 22, and the back electrode 46 of the back substrate 24 with the voltage application device 14, and an electric field according to image information is thereby formed between the substrates.

Still more specifically, the driving of the larger sized colored particles 34 by the magnetic field generator 16 is first performed according to the conditions described above, and then, after that, the colored particles 32 are driven by the voltage application device 14. The colored particles 32 are driven by applying +20 V to the back electrode 46 and 0 V to the front electrode 42 for a duration of one second, and the positively charged colored particles 32 migrate to the display substrate 22 side, thereby displaying black. −20 V is then applied to the back electrode 46 and 0 V is applied to the front electrode 42 for a duration of one second, the positively charged black colored particles 32 migrate to the back substrate 24 side, and white is displayed. The reflectance is measured using a reflection density meter X-Rite 404 (trade name, made by X-Rite Incorporated). After measuring the reflectance, +20 V is again applied to the back electrode 46 and 0 V is applied to the front electrode 42 for a duration of one second, displaying black, and similar displaying and measurements are performed after leaving for desired time intervals (one minute, one hour, or one day), and this is repeated 50 times. The test results are shown in Table 1.

TABLE 1

| | No. of times of change of SN pole alignment | | | | |
|---|---|---|---|---|---|
| | 0 times (none) | 5 times | 10 times | 20 times | 50 times |
| The display is rewritten every one minute | B | A | A | A | A |
| The display is rewritten every one hour | C | C | B | A | A |
| The display is rewritten every one day | C | C | C | B | A |

A: good.
B: not good.
C: poor.

The test results are shown in Table 1, and it may be seen that the effect of preventing a decline in the reflectance increases with an increase in the number of times of driving the larger sized colored particles 34 with the magnetic field generator 16. The white reflectance during white display is substantially improved, even when only repeating the display once every day.

Moreover, these results show that it is not necessary to drive the larger sized colored particles 34 every time the display is rewritten, and the larger sized colored particles 34 may be driven according to the number of times of display repetition and the intervals (for leaving) after image display. In such a manner, since it is not necessary to drive the larger sized colored particles 34 every time the display is rewritten, display rewriting speed may be increased, and lowered power consumption may also be achieved.

It should be noted that with regard to the frequency of change in SN pole alignment of the magnetic recording head, if the frequency is too low then the display rewriting speed may pose a problem and if it is too high the movement of particles is not able follow changes in the magnetic field, and therefore, in the present exemplary embodiment, a range of from about 1 Hz to about 50 Hz is preferable. Moreover the movement of the particles following changes to the magnetic field is dependent on such factors as the size, specific gravity, and shape of the particles, the viscosity of the dispersion medium 28, the magnetic field strength and the like.

(Second Exemplary Embodiment)

Figure 5:
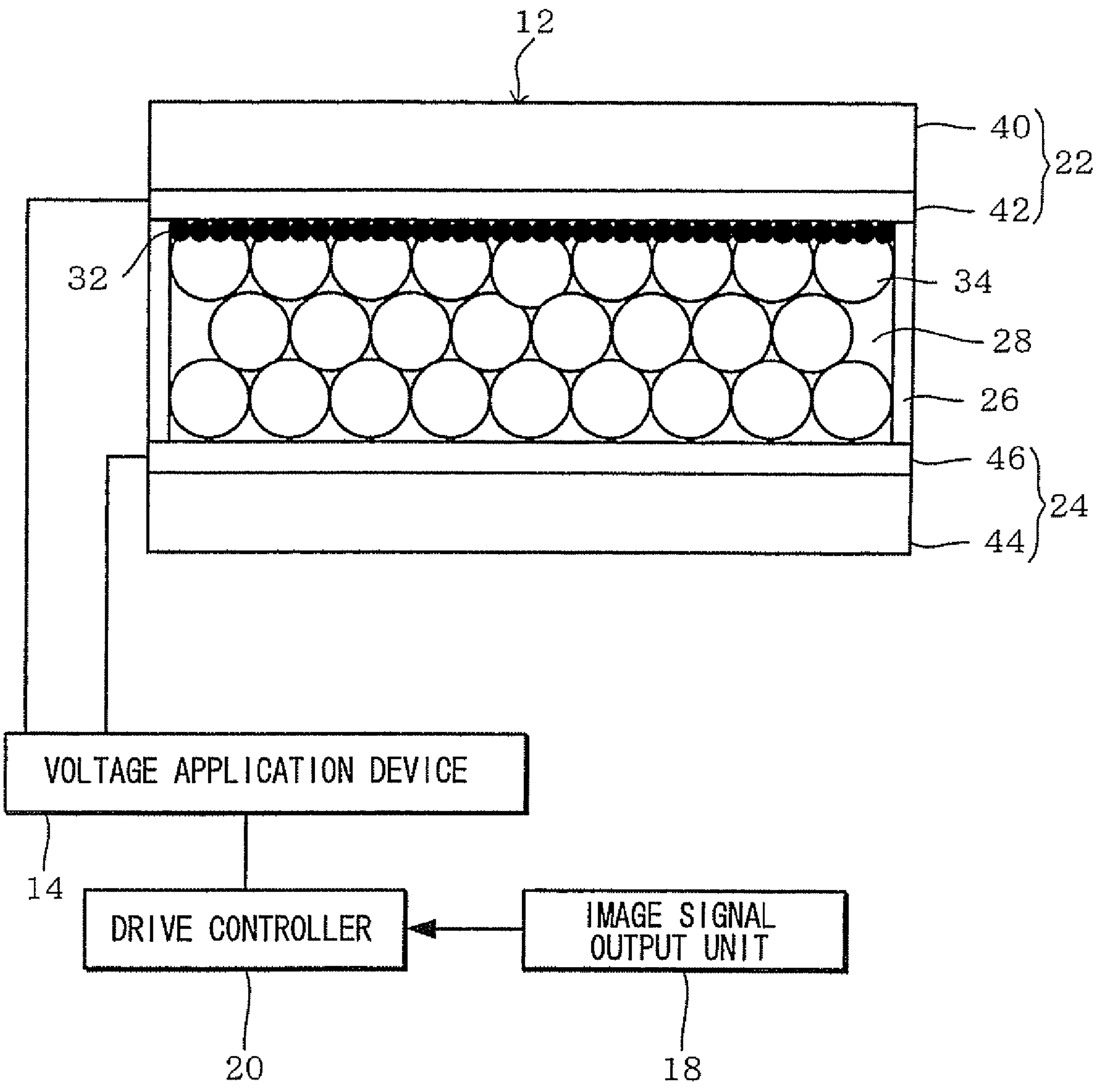
FIG. 5 is an outline block diagram showing an image display device according to a second exemplary embodiment of the present invention.

The image display device according to a second exemplary embodiment of the present invention will now be explained. FIG. 5 is an outline block diagram of an image display device according to the second exemplary embodiment of the present invention. It should be noted that for similar elements of the configuration, the same reference numerals are used as in the first exemplary embodiment, and detailed explanation thereof is omitted.

In the first exemplary embodiment, a magnetic field is applied between the substrates and the larger sized colored particles 34 are moved thereby, in order to separate the colored particles 32 adhering to the larger sized colored particles 34. In the present exemplary embodiment, an electric field is applied and the larger sized colored particles 34 are moved by the electric field in order to separate the adhering colored particles 32. In other words, in the present exemplary embodiment, charged white larger sized colored particles 34 are applied, and the black charged colored particles 32 like those of the first exemplary embodiment are used.

The larger sized colored particles 34 in this embodiment are produced in a similar manner the manufacturing method of the white particles described in the first exemplary embodiment except that the 30 parts by weight of white coated magnetite is not used. The volume average particle size of the obtained white larger sized colored particles 34 is 15 μm. Moreover, the colored particles 32 are the same as those of the black colored particles 32 described in the first exemplary embodiment, and the volume average particle size thereof is 0.8 μm.

The silicone oil (trade name: KF-96; made by Shin-Etsu Chemical Co., Ltd.) with a viscosity of 2 mPa·s is used as the transparent dispersion medium 28 in the same way as in the first exemplary embodiment. In the silicone oil used as the dispersion medium 28, the white larger sized colored particles 34 are positively charged and the black colored particles 32 are negatively charged.

In the present exemplary embodiment, the voltage application device 14 drives the charged larger sized colored particles 34 by forming an electric field between the display substrate 22 and the back substrate 24. Moreover, the voltage application device 14 also drives the charged colored particles 32. Therefore, a single mechanism may serve the double purpose of driving the larger sized colored particles 34 and driving the colored particles 32.

Figure 6:
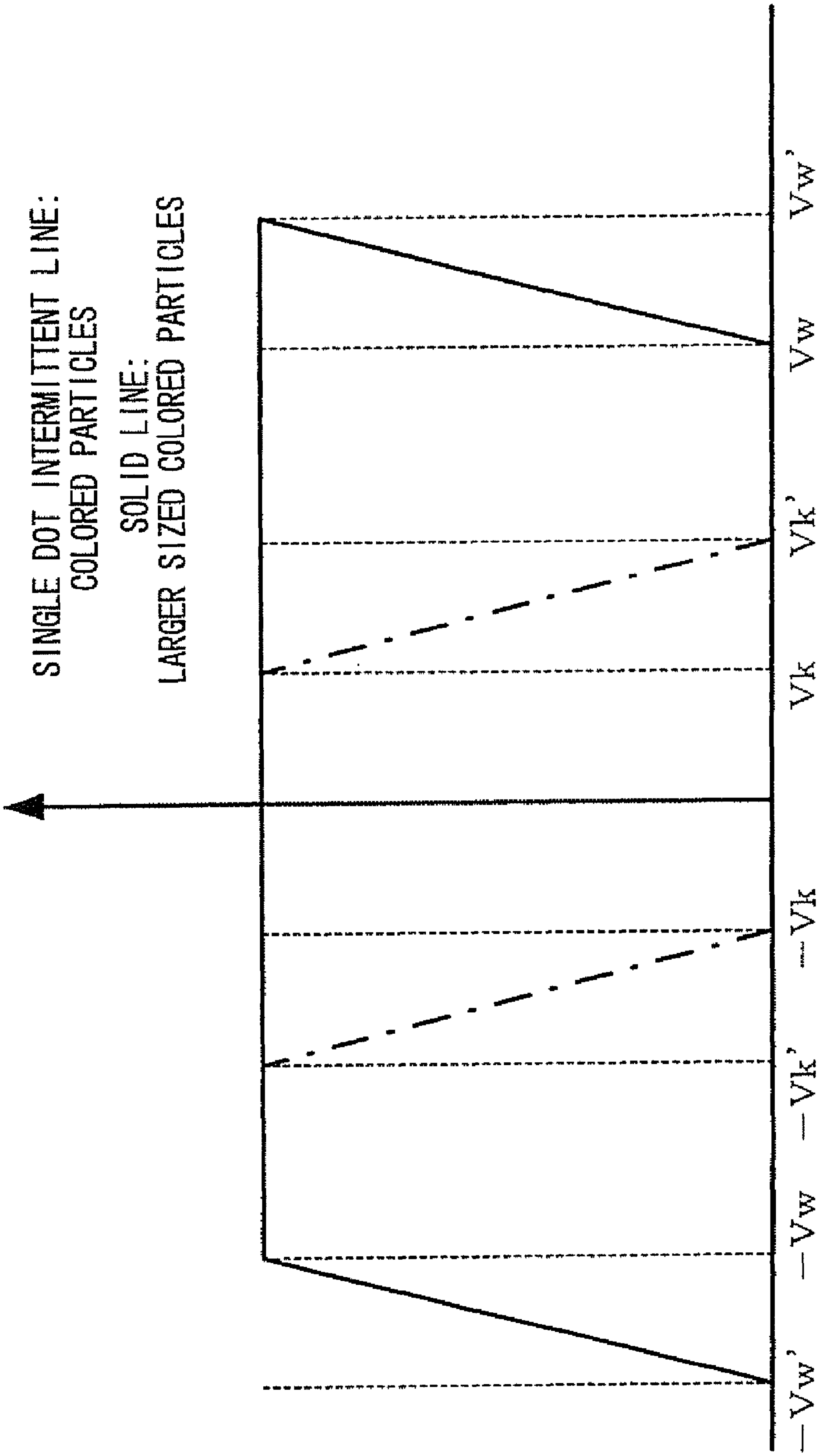
FIG. 6 is a graph showing migration characteristics of larger sized colored particles and migration characteristics of colored particles in the image display device according to the second exemplary embodiment of the present invention.

The driving characteristics of the larger sized colored particles 34 and the colored particles 32 used in the present exemplary embodiment are shown in FIG. 6. The measurements are made using the image display device 10 shown in FIG. 5. When the measurements are made for the drive characteristics shown in FIG. 6, the fill amount of the white larger sized colored particles 34 is reduced and adjusted so that white larger sized colored particles 34 construct substantially a single layer within the cells. The horizontal axis is the voltage applied to the back electrode 46 by the voltage application device 14 (the front electrode 42 is 0 V), and the vertical axis is the quantity of colored particles 32 adhering to the display substrate 22. Magnified observation of the colored particles 32 quantity adhering to the display substrate 22 is carried out using an optical microscope from the display substrate 22 side, and the ratio of the particle adhesion area to the observation area is shown as a percentage.

Specifically, first −50 V is applied to the back electrode 46 and a voltage of 0 V is applied to the front electrode 42 for a duration of one second with the voltage application device 14, the negatively charged black colored particles 32 migrate to the display substrate 22 side and the positively charged white larger sized colored particles 34 migrate to the back substrate 24 side, thereby displaying black. Subsequently, voltage (pulse voltage with a pulse width of one second) is applied to the back electrode 46 and gradually increased from 0 V, and the amount of colored particles adhering to the display substrate 42 is measured.

As a result, the quantity of the colored particles 32 adhering to the display substrate 22 does not change up to Vk (+10 V), that is, the colored particles 32 do not migrate. When the applied voltage exceeds Vk, the quantity of the colored particles 32 which are adhered to the display substrate 22 decreases and when Vk' (15V) is exceeded, there are substantially no colored particles 32 adhered to the display substrate 22.

When the applied voltage is furthermore increased, further migration of the colored particles 32 is not seen until the voltage is increased to Vw (+40 V), when Vw is exceeded, the white larger sized colored particles 34 adhering to the back substrate 24 side start to migrate to the display substrate 22 side. At Vw' (+47V), almost all of the larger sized colored particles 22 migrate to the display substrate 22 side, and white is displayed.

From this white displaying condition, the voltage (pulse voltage with a pulse width of one second) applied to the back electrode 46 is then gradually dropped from 0 V, and the amount of colored particles adhering to the display substrate 22 is measured.

As a result, when −Vk is exceeded the black colored particles 32 which are adhered to the back substrate 24 side start migrating to the display substrate 22 side, and when −Vk' is exceeded, almost all of the colored particles 32 migrate to the display substrate 22 side.

When the applied voltage is further dropped, further migration of each of the colored particles is not seen until as the voltage is dropped to −Vw. When −Vw is exceeded, the white larger sized colored particles 34 adhering to the display substrate 22 side start migrating to the back substrate 24 side. At −Vw', almost all the larger sized colored particles 34 migrate to the back substrate 24 side.

The display method of the image display device according to the second exemplary embodiment of the present invention will now be explained.

First, −50 V is applied to the back electrode 46 of the image display medium 12 shown in FIG. 5 and a voltage of 0 V is applied to the front electrode 42, for a duration of one second, the negatively charged colored particles 32 migrate to the display substrate 22 side, and black is displayed. Confirmation may be made by magnified observation that the positively charged larger sized colored particles 34 move at the same time. +50 V is then applied to the back electrode 46 and 0 V is applied to the front electrode 42, for a duration of one second, the colored particles 32 migrate to the back substrate 24 side, and white is displayed. Confirmation may be made by magnified observation that the positively charged larger sized colored particles 34 also move at the same time. The reflectance of the white display is measured using a reflection density meter X-Rite 404 (trade name, made by X-Rite Incorporated).

After measuring the reflectance, again, −50 V is applied to the back electrode 46 and 0 V is applied to the front electrode 42, for a duration of one second, and black is displayed, and repeated measurements are performed after leaving for desired time intervals (one minute, one hour or one day), and this is repeated 50 times.

There is substantially no change seen in the reflectance of the white display when the display is switched over every minute. Moreover, when the display is switched over every hour and every day, the white reflectance of the white display falls away gradually. That is, the reduction in white reflectance and color turbidity may be suppressed by moving the larger sized colored particles 34, however, this effect decreases as the leaving time increases.

Next, after applying an alternating voltage of ±50 V and 50 Hz to the back electrode 46 of the image display medium 12 for a duration of one second (the front electrode 42 is 0 V), black display is carried out and followed by white display in a similar manner to as described above, and reflectance is measured during white display. Such a measurement cycle is repeated 50 times at desired intervals (one minute, one hour or one day). As a result, there is substantially no change seen in the reflectance during white display under any of the conditions.

A black and white lattice pattern is then displayed as an image with alternate pixels. Specifically, +50 V is applied to the back electrode 46 and 0 V is applied to the front electrode 42 for all the pixels, for a duration of one second, and the colored particles 32 migrate to the back substrate 24 side, displaying white. Then, −50 V is applied to the back electrode 46 of the black display pixels and 0 V is applied to the front electrode 42 thereof, for a duration of one second, and black is displayed for these pixels. Furthermore, a voltage of −50 V is applied to the back electrode 46 and 0 V is applied to the front electrode 42 for all the pixels, for a duration of one second, and the negatively charged colored particles 32 migrate to the display substrate 22 side, and black is displayed. Then, +50 V is applied to the back electrode 46 and a voltage of 0 V is applied to the front electrode 42 of white display pixels, for a duration of one second, and white is displayed for these pixels.

In another display method, +50 V is applied to the back electrode 46 and 0 V is applied to the front electrode 42 for all the pixels, for a duration of one second, and the colored particles 32 migrate to the back substrate 24 side and white is displayed. Then, −20 V, which is a voltage at which the colored particles 32 migrate but the larger sized colored particles 34 do not migrate, is applied to the back electrode 46 of the black display pixels, and 0 V is applied to the front electrode 42 for a duration of one second, and black is displayed for these pixels. Moreover, voltages are applied of −50 V to the back electrode 46 and 0 V to the front electrode 42 for all the pixels, for a duration of one second, the negatively charged colored particles 32 migrate to the display substrate 22 side, and black is displayed. Then, +20 V, which is a voltage at which the colored particles 32 migrate but the larger sized colored particles 34 do not migrate, is applied to the back electrode 46 of the white display pixels, and 0 V is applied to the front electrode 42, for a duration of one second, and white is displayed for these pixels.

As a result, when displaying a black and white lattice pattern, there is less dot shape distortion of the display pixels and good display quality may be obtained in the latter display method in which the larger sized colored particles 34 do not migrate.

It should be noted that although the present exemplary embodiment describes a case in which the larger sized colored particles 34 and the colored particles 32 are of opposite polarity, even if they are of the same polarity, similar results and effects to those of the present exemplary embodiment may be shown.

Moreover, although the voltage ranges where each particle migrates may not overlap in the drive characteristics of the larger sized colored particles 34 and the colored particles 32 shown in FIG. 6, there is no limitation to such and portions of the ranges may overlap.

(Third Exemplary Embodiment)

Figure 7:
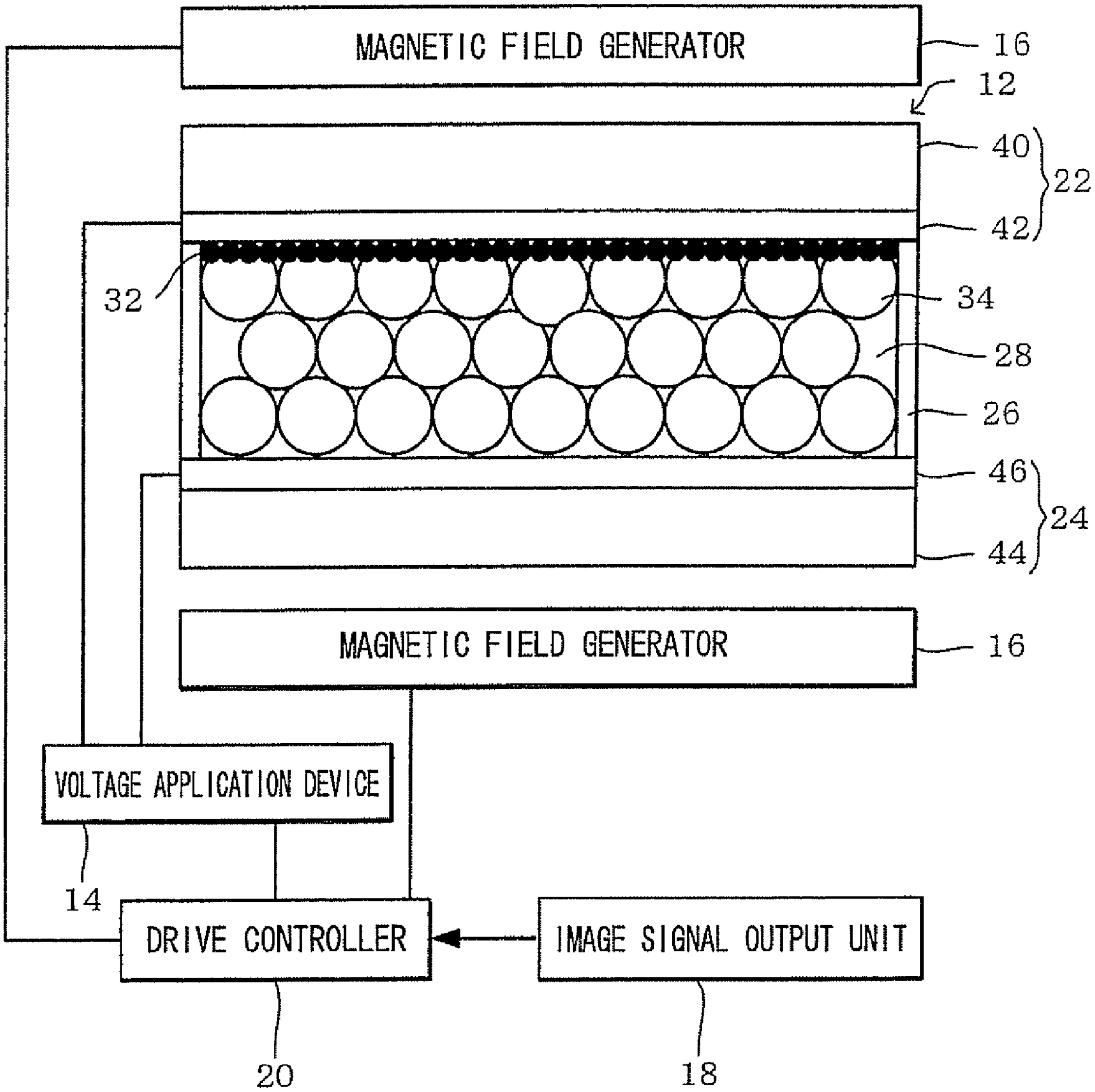

An image display device according to a third exemplary embodiment of the present invention will now be explained. FIG. 7 is an outline block diagram of an image display device according to the third exemplary embodiment of the present invention. It should be noted that for similar elements of the configuration, the same reference numerals are used as in the first exemplary embodiment and second exemplary embodiment, and detailed explanation thereof is omitted.

In the first exemplary embodiment, the larger sized colored particles 34 are moved by applying a magnetic field between the substrates, and the colored particles 32 are migrated by applying an electric field between the substrates. According to the second exemplary embodiment, the larger sized colored particles 34 are moved and the colored particles 32 are migrated by applying an electric field between the substrates. In the third exemplary embodiment, the larger sized colored particles 34 are moved by applying an electric field between the substrates, and the colored particles 32 are migrated by applying a magnetic field between the substrates.

That is, the larger sized colored particles 34 described in the second exemplary embodiment may be used in the present exemplary embodiment, and the colored particles 32 in the present exemplary embodiment may be produced as follows.

A dispersion liquid CA is prepared by mixing 53 parts by weight of a styrene monomer and 25 parts by weight of iron oxide particles, and ball milling with zirconia balls of 10 mm diameter for 20 hours. A calcium carbonate dispersion liquid CB is prepared by mixing 40 parts by weight of calcium carbonate and 60 parts by weight of water and pulverizing with a ball mill like the above. A mixed liquid CC is prepared by mixing 4.3 g of 2% cellogen aqueous-solution, 8.5 g of calcium carbonate powder dispersion liquid B, and 50 g of 20% brine and degassing for 10 minutes with an ultrasonic machine, then agitated with an emulsifier.

Then 35 g of dispersion liquid CA, 1 g of divinylbenzene and 0.35 g of polymerization initiator AIBN are weighed out, sufficiently mixed, and degassed with an ultrasonic machine for 10 minutes. The resultant is added to the mixed liquid CC and emulsified with an emulsifier. Next, this emulsified liquid is placed into a bottle, capped with a silicone bung. Then, using an injection needle, sufficient reduced-pressure deairing is performed and nitrogen gas is injected. Next, reaction is carried out at 60° C. for 10 hours, and particles are produced. After cooing, cyclohexane is removed from the obtained dispersion liquid in a freeze drying apparatus for 2 days at −35° C., 0.1 Pa.

The obtained fine particle powder is dispersed in ion exchange water, the calcium carbonate is decomposed in aqueous hydrochloric acid, and filtering is carried out. The fine particle powder is washed with sufficient distilled water and then dried. 2 parts by weight of the obtained particles are placed, together with 2 parts by weight of nonionic surfactant polyoxyethylene alkyl ether, in 98 parts by weight of silicone oil, stirred and dispersed and a dispersion liquid of a black particle group is prepared. The volume average particle size of the obtained particles of the black particle group is 1 μm.

The image display device according to the present exemplary embodiment, as shown in FIG. 7, has a magnetic field generator 16 disposed on both sides so as to sandwich the image display medium 12.

In the present exemplary embodiment, the larger sized colored particles 34 are driven with the voltage application device 14, and the colored particles 32 are driven with the magnetic field generators 16. The driving of the larger sized colored particles 34 with the voltage application device 14 is performed in the same manner as in the second exemplary embodiment.

That is, as in the second exemplary embodiment, the voltage application device 14 applies a voltage between the substrates and the larger sized colored particles 34 migrate (move) between the substrates according to the voltage. Moreover, the magnetic field generators 16 generate a desired magnetic field between the substrates of the image display medium 12 according to a signal based on image information from the drive controller 20. As the colored particles 32 migrate, for example, as shown in FIG. 8, a white display and a black display may be made by turning the magnetic field generators 16 alternately on and off at the display substrate 22 side and at the back substrate 24 side, respectively.

By configuring in this manner, as in the first exemplary embodiment or the second exemplary embodiment, the colored particles 32 adhering to the larger sized colored particles 34 are separated by driving the larger sized colored particles 34 and driving the colored particles 32 at the same time, or by driving the larger sized colored particles 34 and then driving the colored particles 32, and the reduction in white reflectance and color turbidity during white display may be suppressed, even if repeated display is performed, (Fourth Exemplary Embodiment)

The image display device according to a fourth exemplary embodiment of the present invention will now be explained. FIG. 9 is an outline block diagram of an image display device according to the fourth exemplary embodiment of the present invention. It should be noted that for similar elements of the configuration, the same reference numerals are used as in the first exemplary embodiment to third exemplary embodiment, and detailed explanation thereof is omitted.

In the first exemplary embodiment, the larger sized colored particles 34 are moved by applying a magnetic field between the substrates, and the colored particles 32 are migrated by applying an electric field between the substrates. According to the second exemplary embodiment, the movement of the larger sized colored particles 34 and the migration of the colored particles 32 are performed by applying an electric field between the substrates. In the third exemplary embodiment, the larger sized colored particles 34 are moved by applying an electric field between the substrates, and the colored particles 32 are migrated by applying a magnetic field between the substrates. According to the fourth exemplary embodiment, movement of the larger sized colored particles 34 and migration of the colored particles 32 are performed by applying a magnetic field between the substrates.

That is, as shown in FIG. 9, the image display device according to the present exemplary embodiment is provided only with the magnetic field generators 16, and is the configuration of the image display device of the third exemplary embodiment in which the front electrode 42, the back electrode 46, and the voltage application device 14 have been omitted.

In the present exemplary embodiment, in order to drive the larger sized colored particles 34 and the colored particles 32 independently, the amount of magnetic powder contained in the larger sized colored particles 34 and the colored particles 32 differs. Due to this there is a difference in the magnetic force received from the same magnetic field, and, therefore, it becomes possible, by controlling the strength of the magnetic field generated with the magnetic field generator 16, to simultaneous drive the larger sized colored particles 34 and the colored particles 32, or to drive only the colored particles 32.

In the image display method of the present exemplary embodiment, the magnetic field strength is controlled, instead of the voltage of the second exemplary embodiment, and the larger sized colored particles 34 and the colored particles 32 are respectively driven in the same manner as in the second exemplary embodiment. Therefore, the colored particles 32 are driven at the same time as driving the larger sized colored particles 34, or the colored particles 32 are driven after driving the larger sized colored particles 34. By doing so, the colored particles 32 adhering to the larger sized colored particles 34 are separated in a similar manner to that of the second exemplary embodiment and the reduction in white reflectance and color turbidity during white display may be suppressed even when displaying repeatedly.

(Fifth Exemplary Embodiment)

The image display device according to a fifth exemplary embodiment of the present invention will now be explained. FIG. 10 is an outline block diagram of an image display device according to the fifth exemplary embodiment of the present invention. It should be noted that for similar elements of the configuration, the same reference numerals are used as in the first exemplary embodiment, and detailed explanation thereof is omitted.

In the first exemplary embodiment, the larger sized colored particles 34 are moved by applying a magnetic field between the substrates and the colored particles 32 are migrated by applying an electric field between the substrates, however, in the present exemplary embodiment, in order to move the larger sized colored particles 34, vibration is applied between the substrates so as to move the larger sized colored particles 34.

That is, the image display device according to the present exemplary embodiment is provided with the vibration applying unit 50 instead of the magnetic field generator 16 of the first exemplary embodiment, as shown in FIG. 10.

The vibration applying unit 50 is provided at the back substrate 24 side of the image display medium 12 and in contact therewith, and at least the larger sized colored particles 34 are moved (vibrated) by vibrating the image display medium 12 mechanically.

The vibration applying unit 50 may, for example, be a vibrator or a piezoelectric element provided in contact with the back substrate 24, or a piezoelectric member may be laminated to the back substrate 24. Alternatively, an ultrasonic head or the like may be provided in contact with the back substrate 24, and ultrasonic vibration may be applied to the image display medium 12.

In the image display method of the present exemplary embodiment, by applying vibration using the vibration applying unit 50 to the image display medium 12, at least the larger sized colored particles 34 are moved, and the colored particles 32 are driven either simultaneously therewith, or after movement of the larger sized colored particles 34, in a similar manner to each of the above exemplary embodiments. By so doing, the colored particles 32 adhering to the larger sized colored particles 34 are separated in a similar manner to in each of the above exemplary embodiments and the reduction in white reflectance and color turbidity during white display may be suppressed, even when displaying repeatedly.

It should be noted that although the present exemplary embodiment provides the vibration applying unit 50, so as to vibrate the larger sized colored particles 34, instead of the magnetic field generator 16 of the first exemplary embodiment, there is no limitation thereto and the vibration applying unit 50 may be suitably provided to each of the above exemplary embodiments.

(Sixth Exemplary Embodiment)

The image display device according to a sixth exemplary embodiment of the present invention will now be explained. FIG. 11 is an outline block diagram of an image display device according to the sixth exemplary embodiment of the present invention. It should be noted that for similar elements of the configuration, the same reference numerals are used as in the second exemplary embodiment, and detailed explanation thereof is omitted.

In the second exemplary embodiment the larger sized colored particles 34 are moved (migrate between the substrates) by applying a voltage between the substrates and the colored particles 32 are migrated between the substrates by applying a lower voltage than the voltage with which the larger sized colored particles 34 are moved, however in the present exemplary embodiment, when moving the larger sized colored particles 34, this is done with a rotating motion.

Moreover, although an example is described in the present exemplary embodiment in which three kinds of colored particles 32 are enclosed between the substrates, there is no limitation thereto. One kind or two kinds of colored particles may be enclosed, like the first exemplary embodiment, or four or more kinds of colored particles 32 may be enclosed.

The larger sized colored particles 34 in the present exemplary embodiment, in contrast to the larger sized colored particles 34 of the first exemplary embodiment, have a portion that is positively charged and another portion that is negatively charged. That is, the larger sized colored particles 34 rotate according to the polarity of the voltage applied between the substrates.

However, the three kinds of colored particles 32 may be produced in the same manner as the colored particles 32 of the first exemplary embodiment, and only differ therefrom in their color. In the present exemplary embodiment, the three kinds of colored particles 32 are cyan particles 32C which are colored cyan, magenta particles 3M which are colored magenta, and yellow particles 32Y which are colored yellow, and these are enclosed between the substrates. The color of the three kinds of colored particles 32 are not limited thereto, particles that are colored in other colors may also be used.

With regard to the applied voltage required in order to migrate each of the colored particles 32, the absolute values of voltage required, in order to migrate each of the respective colored particles 32 between the substrates according to an electric field during electrophoresis, differ for each of the kinds of colored particles. Moreover, at least one kind of the colored particles 32 are charged with an opposite polarity to the others. Specifically, the voltage ranges required in order to migrate each of the respective colored particles 32 differ, as shown in FIG. 12. Here, "voltage ranges required in order to migrate the colored particles" refers to the range from the voltage required in order to initiate particle migration, up to the voltage, even if the boltage and the voltage application time is increased from the voltage which there is no further change in the display density and the display density is saturated.

Moreover, the voltage range (absolute value) required in order to rotate the larger sized colored particles 34, differs from the voltage ranges (absolute values) required in order to migrate each of the respective colored particles 32, as shown in FIG. 12. The voltage range (absolute values) required in order to rotate the larger sized colored particles 34 is larger than the voltage ranges (absolute values) required in order to migrate each of the respective colored particles 32. It should be noted that in FIG. 12, although the display density is not affected even if the larger sized colored particles 34 rotate, a case where the portion that is negatively charged of the larger sized colored particles 34 is located to the display substrate 24 side is shown as the display density is dark.

That is, the larger sized colored particles 34 are rotated by applying the maximum voltage from the voltages for migrating (rotating) the larger sized colored particles 34 and each of the respective colored particles 32. By so doing, each of the colored particles 32 adhering to the larger sized colored particles 34 are separated in a similar manner to in each of the above exemplary embodiments.

In the present exemplary embodiment, in order to display a predetermined color (displaying cyan or red, in this embodiment, by the color of the colored particles 32 which migrate to the display substrate 22 when a voltage that rotates the larger sized colored particles 34 is applied), the larger sized colored particles 34 are rotated and the colored particles 32 are migrated at the same time as this rotation, or after the rotation of the larger sized colored particles 34. Moreover, in order to display other colors, the colored particles 32 are migrated after rotation of the larger sized colored particles 34. The colored particles 32 adhering to the larger sized colored particles 34 are separated in a similar manner to in each above exemplary embodiments and the reduction in white reflectance and color turbidity during white display may be suppressed, even when displaying repeatedly.

It should be noted that although examples have been given in which one kind of colored particle is enclosed between the substrates in the above first to fifth exemplary embodiments, there is no limitation thereto, and two kinds of colored particles 32 with different respective colors may be enclosed between the substrates or three kinds of colored particles 32 with different respective colors may be enclosed between the substrates like in the sixth exemplary embodiment, or four or more kinds of colored particles 32 may be enclosed between the substrates.

Moreover, although an example is given in the sixth above exemplary embodiment in which larger sized colored particles 34 that are colored white, with a portion thereof that is positively charged, and another portion thereof that is negatively charged, are enclosed between the substrates, the larger sized colored particles 34 may be coated in two separate colors. For example, each of the charged portions may be colored a different color.

Moreover, in the sixth exemplary embodiment above, the larger sized colored particles 34 enclosed between the substrates are rotated by forming an electric field, due to a portion of the larger sized colored particles 34 being positively charged and another portion being negatively charged, however, there is no limitation thereto. For example, the larger sized colored particles may be rotated by providing portions thereon with a magnetic N-pole and portions thereon with a magnetic S-pole, and forming a magnetic field between the substrates. In this case each of the polar portions may be coated in a separate color.

Moreover, although the colored particles 32 are migrated by forming an electric field between the substrates in the above sixth exemplary embodiment, there is no limitation thereto. The colored particles 32 may be migrated by forming a magnetic field between the substrates, like the third exemplary embodiment or the fourth exemplary embodiment.

Furthermore, although each of above exemplary embodiments is described with respective examples, suitable combinations may be made of the respective exemplary embodiments.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. An image display medium comprising:

a pair of substrates, disposed with a separation therebetween, at least one of the pair of substrates being transparent;

a transparent dispersion medium that is enclosed between the pair of substrates;

one or more kind of colored particles, each kind of the colored particles being colored a predetermined color and being dispersed in the dispersion medium, each kind of the colored particles having predetermined charge characteristics or predetermined magnetic properties and being able to migrate between the pair of substrates; and larger sized colored particles that have a different color and a larger particle size than those of the colored particles, the larger sized colored particles being disposed so that the colored particles are able to pass through the separation, the larger sized colored particles having charge characteristics or magnetic properties which are different from the colored particles, and the larger sized colored particles being able to move, wherein the image display medium includes an amount of larger sized colored particles such that a substantially whole visible area of a view side of the pair of substrates can be covered by at least one layer of the larger sized colored particles.

2. An image display device comprising:

a pair of substrates, disposed with a separation therebetween, at least one of the pair of substrates being transparent;

a transparent dispersion medium that is enclosed between the pair of substrates;

one or more kind of colored particles, each kind of the colored particles being colored a predetermined color and being dispersed in the dispersion medium, each kind of the colored particles having predetermined charge characteristics or predetermined magnetic properties and being able to migrate between the pair of substrates;

larger sized colored particles that have a different color and a larger particle size than those of the colored particles, the larger sized colored particles being disposed so that the colored particles are able to pass through the separation, the larger sized colored particles having charge characteristics or magnetic properties which are different from the colored particles, and the larger sized colored particles being able to move;

a migration force applying unit that migrates the colored particles; and a movement force applying unit that moves the larger sized colored particles, wherein the image display medium includes an amount of larger sized colored particles such that a substantially whole visible area of a view side of the pair of substrates can be covered by at least one layer of the larger sized colored particles.

3. The image display device according to claim 2, wherein, when the larger sized colored particles have the predetermined charge characteristic, the movement force applying unit is an electric field generator that forms an electric field between the pair of substrates.

4. The image display device according to claim 2, wherein, when the larger sized colored particles have the predetermined magnetic properties, the movement force applying unit is a magnetic field generator that forms a magnetic field between the pair of substrates.

5. The image display device according to claim 2, wherein, when the colored particles have the predetermined charge characteristic, the migration force applying unit is an electric field generator that forms an electric field between the pair of substrates.

6. The image display device according to claim 2, wherein, when the colored particles have the predetermined magnetic properties, the migration force applying unit is a magnetic field generator that forms a magnetic field between the pair of substrates.

7. The image display device according to claim 2, wherein, when the colored particles and the larger sized colored particles have different respective charge characteristics from each other, an electric field generator that forms an electric field between the pair of substrates serves both as the migration force applying unit and as the movement force applying unit.

8. The image display device according to claim 7, wherein a stronger electric field is required to move the larger sized colored particles compared to the electric field strength that is required in order to migrate the colored particles.

9. The image display device according to claim 2, wherein, when the colored particles and the larger sized colored particles have different respective magnetic properties from each other, a magnetic field generator that forms a magnetic field between the pair of substrates serves both as the migration force applying unit and as the movement force applying unit.

10. The image display device according to claim 9, wherein a stronger magnetic field is required to move larger sized colored particles than the magnetic field strength required to migrate the colored particles.

11. The image display device according to claim 2, wherein the movement force applying unit is a vibration applying unit which imparts vibration mechanically.

12. An image display device comprising:

a pair of substrates, disposed with a separation therebetween, at least one of the pair of substrates being transparent;

a transparent dispersion medium that is enclosed between the pair of substrates;

one or more kind of colored particles, each kind of the colored particles being colored a predetermined color and being dispersed in the dispersion medium, each kind of the colored particles having predetermined charge characteristics or predetermined magnetic properties and being able to migrate between the pair of substrates;

larger sized colored particles that have a different color and a larger particle size than those of the colored particles, the larger sized colored particles being disposed so that the colored particles are able to pass through the separation, the larger sized colored particles having charge characteristics or magnetic properties which are different from the colored particles, and the larger sized colored particles being able to move;

a migration force applying unit that migrates the colored particles; and a movement force applying unit that moves the larger sized colored particles, wherein the larger sized colored particles have at least a portion that is a distance from the center of gravity thereof and that is charged with a positive or a negative polarity, and the larger sized colored particles are particles of a rotational body shape that rotate according to an electric field that is formed between the substrates, and the movement force applying unit is an electric field generator that forms an electric field between the pair of substrates.

13. An image display device comprising:

a pair of substrates, disposed with a separation therebetween, at least one of the pair of substrates being transparent;

a transparent dispersion medium that is enclosed between the pair of substrates;

one or more kind of colored particles, each kind of the colored particles being colored a predetermined color and being dispersed in the dispersion medium, each kind of the colored particles having predetermined charge characteristics or predetermined magnetic properties and being able to migrate between the pair of substrates;

larger sized colored particles that have a different color and a larger particle size than those of the colored particles, the larger sized colored particles being disposed so that the colored particles are able to pass through the separation, the larger sized colored particles having charge characteristics or magnetic properties which are different from the colored particles, and the larger sized colored particles being able to move;

a migration force applying unit that migrates the colored particles; and a movement force applying unit that moves the larger sized colored particles, wherein the larger sized colored particles have at least a portion that is a distance from the center of gravity thereof and that is a magnetic N pole or a magnetic S pole, and the larger sized colored particles are particles of a rotational body shape that rotate according to a magnetic field that is formed between the substrates, and the movement force applying unit is a magnetic field generator that forms a magnetic field between the pair of substrates.

14. The image display device according to claim 2, wherein the larger sized colored particles are substantially white in color.

15. The image display device according to claim 2, wherein the larger sized colored particles comprise a binder resin and a material with a larger specific gravity than that of the binder resin.

16. The image display device according to claim 2, wherein the colored particles are migrated by the migration force applying unit at the same time as the larger sized colored particles are moved by the movement force applying unit.

17. The image display device according to claim 2, wherein the colored particles are migrated by the migration force applying unit after the larger sized colored particles are moved by the movement force applying unit.

18. An image display medium comprising:

a pair of substrates, disposed with a separation therebetween, at least one of the pair of substrates being transparent;

a transparent dispersion medium that is enclosed between the pair of substrates;

one or more kind of colored particles, each kind of the colored particles being colored a predetermined color and being dispersed in the dispersion medium, each kind of the colored particles having predetermined charge characteristics or predetermined magnetic properties and being able to migrate between the pair of substrates; and larger sized colored particles that have a different color and a larger particle size than those of the colored particles, the larger sized colored particles being disposed so that the colored particles are able to pass through the separation, the larger sized colored particles having charge characteristics or magnetic properties which are different from the colored particles, and the larger sized colored particles being able to move, wherein the image display medium includes an amount of larger sized colored particles such that a substantially whole visible area of a view side of the pair of substrates can be covered by at least one layer of the larger sized colored particles, and the larger sized color particles are in substantially a single size.

19. An image display device comprising:

a pair of substrates, disposed with a separation therebetween, at least one of the pair of substrates being transparent;

a transparent dispersion medium that is enclosed between the pair of substrates;

one or more kind of colored particles, each kind of the colored particles being colored a predetermined color and being dispersed in the dispersion medium, each kind of the colored particles having predetermined charge characteristics or predetermined magnetic properties and being able to migrate between the pair of substrates;

larger sized colored particles that have a different color and a larger particle size than those of the colored particles, the larger sized colored particles being disposed so that the colored particles are able to pass through the separation, the larger sized colored particles having charge characteristics or magnetic properties which are different from the colored particles, and the larger sized colored particles being able to move;

a migration force applying unit that migrates the colored particles; and a movement force applying unit that moves the larger sized colored particles, wherein the image display medium includes an amount of larger sized colored particles such that a substantially whole visible area of a view side of the pair of substrates can be covered by at least one layer of the larger sized colored particles, and the larger sized color particles are in substantially a single size.

* * * * *